US010862644B2

United States Patent
Li et al.

(10) Patent No.: US 10,862,644 B2
(45) Date of Patent: Dec. 8, 2020

(54) METHOD AND APPARATUS FOR PHASE COMPENSATION USING PHASE-TRACKING REFERENCE SIGNAL

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Rakesh Tamrakar, Beijing (CN); Xin Su, Beijing (CN); Runhua Chen, Beijing (CN); Qiuping Huang, Beijing (CN); Chuanjun Li, Beijing (CN); Mengjun Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/349,014

(22) PCT Filed: Dec. 28, 2017

(86) PCT No.: PCT/CN2017/119381
§ 371 (c)(1),
(2) Date: May 10, 2019

(87) PCT Pub. No.: WO2018/121671
PCT Pub. Date: Jul. 5, 2018

(65) Prior Publication Data
US 2019/0312697 A1 Oct. 10, 2019

(30) Foreign Application Priority Data
Dec. 28, 2016 (CN) .......................... 2016 1 1236137

(51) Int. Cl.
*H04L 5/00* (2006.01)
*H04B 7/0456* (2017.01)

(52) U.S. Cl.
CPC ......... *H04L 5/0048* (2013.01); *H04B 7/0456* (2013.01); *H04L 5/00* (2013.01)

(58) Field of Classification Search
CPC ..... H04L 5/0048; H04L 5/00; H04L 27/0014; H04L 27/266; H04L 27/2675;
(Continued)

(56) References Cited

U.S. PATENT DOCUMENTS 10,439,663 B2 * 10/2019 Islam .................. H04J 13/0074
2004/0127179 A1 7/2004 Sasaki
(Continued)

FOREIGN PATENT DOCUMENTS

CN 102036360 A 4/2011
CN 103036820 A 4/2013
(Continued)

OTHER PUBLICATIONS

Intel Corporation, Study of phase noise tracking, 3GPP TSG-RAN WG1 #86 R1-167888, Gothenburg, Sweden, Aug. 22-26, 2016 ( Year: 2016).*
(Continued)

*Primary Examiner* — Mounir Moutaouakil
(74) *Attorney, Agent, or Firm* — Flener IP & Business Law; Zareefa B. Flener; Ayhan E. Mertogul

(57) ABSTRACT

The present disclosure provides a reference signal transmission method, a transmitter and a receiver. The reference signal transmission method includes: precoding, by a transmitter, a data stream for user data through a second precoding matrix so as to acquire D virtual data streams; precoding, by the transmitter, the D virtual data streams through a first precoding matrix, and transmitting the D precoded virtual
(Continued)

data streams to a receiver via T antenna groups, each antenna group including one or more antenna units or antenna ports having a same phase noise; transmitting, by the transmitter, D demodulation reference signals to the receiver; and transmitting, by the transmitter, M phase-tracking reference signals to the receiver, the M phase-tracking reference signals being adopted to track phase changes in the T antenna groups caused by one or more phase noise sources.

14 Claims, 8 Drawing Sheets

(58) Field of Classification Search
CPC .............. H04L 27/2613; H04L 25/0204; H04L 25/0228; H04L 5/0051; H04B 7/0456; H04B 7/0473; H04B 7/0874; H04B 7/0691
See application file for complete search history.

(56) References Cited

U.S. PATENT DOCUMENTS

| | | | |
|---|---|---|---|
| 2007/0064502 | A1 | 3/2007 | Yen |
| 2013/0309976 | A1 | 11/2013 | Shay Koren et al. |
| 2013/0322566 | A1* | 12/2013 | Murakami .......... H04L 27/2626 375/295 |
| 2016/0065282 | A1 | 3/2016 | Zhang |
| 2019/0081825 | A1* | 3/2019 | Pajukoski ................ H04L 27/26 |

FOREIGN PATENT DOCUMENTS

| | | |
|---|---|---|
| CN | 104243368 A | 12/2014 |
| JP | 2007089114 | 4/2007 |
| JP | 2016524405 A | 8/2016 |

OTHER PUBLICATIONS

InterDigital Communications, Channel estimation and phase tracking for Unique Word DFT-s-OFDM, 3GPP TSG-RAN WG1, Meeting #86 R1-167560, Gothenburg, Sweden, Aug. 22-26, 2016 (Year: 2016).*
Intel Corporation, Study of phase noise tracking, 3GPP TSG-RAN WG1 #86 R1-166562, Gothenburg, Sweden, Aug. 22-26, 2016 ( Year: 2016).*
European Patent Office, Date: Nov. 25, 2019, PCT/CN2017119381, Applicant: China Academy of Telecommunications Technology, Communication Pursuant to Rule 164(1) EPC.
3GPP TSG-RAN WG1 #86, R1-166379, Aug. 22-26, 2016, Gothenburg, Sweden, Agenda Item: 8.1.5, Source: Qualcomm Incorporated, Title: DL MIMO Transmission Schemes, Document for: Discussion/Decision.
3GPP TSG RAN WG1 #87, R1-1611382, Reno, USA, Nov. 14-18, 2016, Agenda Item: 7.1.3.2, Source: Catt, Title: Discussion on Phase Tracking RS for NR, Document for: Discussion and Decision.
3GPP TSG RAN WG1 Meeting #87, R1-1611811, Reno, USA Nov. 14-18, 2016, Agenda Item: 7.1.3.2, Source: LG Electronics, Title: Discussion on Phase Tracking RS for Multi-Antenna, Document for: Discussion.
3GPP TSG-RAN WG1 #87, R1-1612054, Nov. 14-18, 2016, Reno, Nevada USA, Agenda Item: 7.1.3.2, Source: Qualcomm Incorporated, Title: Phase and Frequency Tracking Reference Signal Considerations, Document for: Discussion/Decision.
3GPP TSG-RAN WG1#87, R1-1612860, Reno, U.S.A., Nov. 14-18, 2016, Agenda Item: 8.1.4.4, Source: Nokia, Alcatel-Lucent Shanghai Bell, Title: On RS Design for Phase Tracking in NR, Document for: Discussion and Decision.
3GPP TSG RAN WG1 #86 BIS, R1-1609100, Lisbon, Portugal, Oct. 10-14, 2016, Agenda Item: 8.1.4.4, Source: Samsung, Title: On the Support of Compensation of Phase Rotation in NR, Document for: Discussion and Decision.
Verizon, TS V5G.211 V1.3 (Jun. 2016), Verizon 5G TF; Air Interface Working Group; Verizon 5th Generation Radio Access; Physical Channels and Modulation (Release 1).
International Search Report and Written Opinion for PCT/CN2017/ 119381.
Notice of Reasons for Refusal, Japanese Application No. 2019-524978, Date of Drafting: Jul. 29, 2020, Representative/Applicant: Fujita, Kazuko.

* cited by examiner

METHOD AND APPARATUS FOR PHASE COMPENSATION USING PHASE-TRACKING REFERENCE SIGNAL

CROSS-REFERENCE TO RELATED APPLICATION

The present application is the U.S. national phase entry of PCT Application No. PCT/CN2017/119381 filed on Dec. 28, 2017, which claims priority to Chinese patent application 201611236137.2 filed on Dec. 28, 2016, which are both incorporated herein by reference in their entirety.

TECHNICAL FIELD

The present disclosure relates to the field of communication technology, in particular to a reference signal transmission method, a transmitter and a receiver.

BACKGROUND

Usually, there are phase noises during the transmission of a signal for a communication system, and the phase noises are derived from local oscillators in a transmitter and a receiver. The transmission of a multiple-carrier signal may be adversely affected by the phase noises, especially the phase noises at a high frequency band (e.g., 6 GHz or more). However, more resources at the high frequency band (e.g., 6 GHz to 100 GHz) will be adopted for the data transmission in a future communication system, e.g., a fifth Generation (5G) or a sixth Generation (6G) communication system. Due to the serious influence caused by the phase noises at the high frequency band, there is an urgent need to provide a scheme for reducing the influence caused by the phase noises.

SUMMARY

An object of the present disclosure is to provide a reference signal transmission method, a transmitter and a receiver, so as to reduce the influence caused by the phase noises.

In one aspect, the present disclosure provides in some embodiments a reference signal transmission method, including: precoding, by a transmitter, a data stream for user data through a second precoding matrix so as to acquire D virtual data streams; precoding, by the transmitter, the D virtual data streams through a first precoding matrix, and transmitting the D precoded virtual data streams to a receiver via T antenna groups, each antenna group including one or more antenna units or antenna ports having a same phase noise, T being an integer greater than or equal to 1, D being an integer greater than or equal to 1; transmitting, by the transmitter, D demodulation reference signals to the receiver, each demodulation reference signal corresponding to one virtual data stream, a precoding vector for each demodulation reference signal being the same as a precoding vector in the first precoding matrix adopted by the corresponding virtual data stream on a subcarrier where the demodulation reference signal is located, each demodulation reference signal and the corresponding virtual data stream being transmitted via a same antenna group; and transmitting, by the transmitter, M phase-tracking reference signals to the receiver, the M phase-tracking reference signals being adopted to track phase changes in the T antenna groups caused by one or more phase noise sources, M being an integer greater than or equal to 1.

In some possible embodiments of the present disclosure, each virtual data stream is precoded and then transmitted via one or more antenna groups, and the one or more antenna groups for the same virtual data stream have a same phase noise.

In some possible embodiments of the present disclosure, among the precoding vectors in the first precoding matrix adopted by each virtual data stream, apart from weight values corresponding to the one or more antenna groups for the virtual data stream, weight values corresponding to the antenna units or antenna ports in the other antenna groups are zero.

In some possible embodiments of the present disclosure, each phase-tracking reference signal is precoded and then transmitted via one or more antenna groups, and the one or more antenna groups for the same phase-tracking reference signal have a same phase noise.

In some possible embodiments of the present disclosure, among precoding vectors adopted by each phase-tracking reference signal, apart from weight values corresponding to one or more antenna groups adopted by the phase-tracking reference signal, weight values corresponding to the antenna units or antenna ports in the other antenna groups are zero.

In some possible embodiments of the present disclosure, information about the second precoding matrix is pre-agreed between the transmitter and the receiver, or the reference signal transmission method further includes: transmitting, by the transmitter, the information about the second precoding matrix to the receiver; or transmitting, by the transmitter, a rule adopted by the second precoding matrix on a data bandwidth to the receiver.

In some possible embodiments of the present disclosure, a mapping relationship between the demodulation reference signals and the phase-tracking reference signals is pre-agreed between the transmitter and the receiver, or the reference signal transmission method further includes transmitting, by the transmitter, the mapping relationship between the demodulation reference signals and the phase-tracking reference signals to the receiver.

In some possible embodiments of the present disclosure, in the mapping relationship between the demodulation reference signals and the phase-tracking reference signals, one phase-tracking reference signal at least corresponds to one demodulation reference signal, and each phase-tracking reference signal and the corresponding demodulation reference signal are transmitted via a same antenna group; and a precoding vector adopted by each phase-tracking reference signal is associated with a precoding vector in the first precoding matrix adopted by the corresponding virtual data stream on a subcarrier where the phase-tracking reference signal is located, and the virtual data stream corresponding to each phase-tracking reference signal corresponds to the demodulation reference signal corresponding to the phase-tracking reference signal.

In some possible embodiments of the present disclosure, when each phase-tracking reference signal corresponds to one demodulation reference signal, the precoding vector adopted by the phase-tracking reference signal is the same as the precoding vector in the first precoding matrix adopted by the corresponding virtual data stream on the subcarrier where the phase-tracking reference signal is located; and when each phase-tracking reference signal corresponds to a plurality of demodulation reference signals, the precoding vector adopted by the phase-tracking reference signal is calculated in accordance with the precoding vectors in the first precoding matrix adopted by a plurality of virtual data streams on the subcarrier where the phase-tracking reference signal is located, and the plurality of virtual data streams corresponds to the plurality of demodulation reference signals.

In another aspect, the present disclosure provides in some embodiments a reference signal transmission method, including: receiving, by a receiver, a data signal from a transmitter; receiving, by the receiver, demodulation reference signals from the transmitter, and estimating a channel for each demodulation reference signal, each antenna unit or antenna port of the receiver being configured to receive D demodulation reference signals, D being an integer greater than or equal to 1; receiving, by the receiver, phase-tracking reference signals from the transmitter, and estimating a channel for each phase-tracking reference signal, each antenna unit or antenna port of the receiver being configured to receive M phase-tracking reference signals, M being an integer greater than or equal to 1; performing, by the receiver, with respect to each antenna unit or antenna port, phase compensation on the estimated channels for the received D demodulation reference signals in accordance with the M phase-tracking reference signals received via the antenna unit or antenna port, so as to acquire a compensation channel estimation value for each demodulation reference signal on a symbol where the corresponding phase-tracking reference signal is located; acquiring, by the receiver, channel information in accordance with a compensation channel estimation matrix and a second precoding matrix, the compensation channel estimation matrix including the compensation channel estimation value for each demodulation reference signal received via the antenna unit or antenna port on the symbol where the corresponding phase-tracking reference signal is located; and demodulating, by the receiver, the data signal in accordance with the channel information, so as to acquire user data.

In some possible embodiments of the present disclosure, the performing, by the receiver, with respect to each antenna unit or antenna port, phase compensation on the estimated channels for the received D demodulation reference signals in accordance with the M phase-tracking reference signals received via the antenna unit or antenna port so as to acquire the compensation channel estimation value for each demodulation reference signal on the symbol where the corresponding phase-tracking reference signal is located includes: determining, by the receiver, with respect to each antenna unit or antenna port, the demodulation reference signal corresponding to each phase-tracking reference signal received via the antenna unit or antenna port in accordance with a mapping relationship between the demodulation reference signals and the phase-tracking reference signals; comparing, by the receiver, the estimated channel for each phase-tracking reference signal with the estimated channel for the corresponding demodulation reference signal, so as to acquire phase change information corresponding to the phase-tracking reference signal; and performing, by the receiver, phase noise compensation on the estimated channel for the corresponding demodulation reference signal in accordance with the phase change information corresponding to each phase-tracking reference signal, so as to acquire the compensation channel estimation value for each demodulation reference signal on the symbol where the corresponding phase-tracking reference signal is located.

In some possible embodiments of the present disclosure, the mapping relationship is pre-agreed between the transmitter and the receiver, or the reference signal transmission method further includes receiving, by the receiver, the mapping relationship from the transmitter.

In some possible embodiments of the present disclosure, the acquiring, by the receiver, the channel information in accordance with the compensation channel estimation matrix and the second precoding matrix includes multiplying, by the receiver, the compensation channel estimation matrix by the second precoding matrix so as to acquire the channel information.

In some possible embodiments of the present disclosure, information about the second precoding matrix is pre-agreed between the transmitter and the receiver, or the reference signal transmission method further includes: receiving, by the receiver, the information about the second precoding matrix from the transmitter; or receiving, by the receiver, a rule adopted by the second precoding matrix on a data bandwidth from the transmitter, and acquiring the second precoding matrix in accordance with the rule.

In yet another aspect, the present disclosure provides in some embodiments a transmitter, including: an encoding module configured to precode a data stream for user data through a second precoding matrix so as to acquire D virtual data streams; a first transmission module configured to precode the D virtual data streams through a first precoding matrix, and transmit the D precoded virtual data streams to a receiver via T antenna groups, each antenna group including one or more antenna units or antenna ports having a same phase noise, T being an integer greater than or equal to 1, D being an integer greater than or equal to 1; a second transmission module configured to transmit D demodulation reference signals to the receiver, each demodulation reference signal corresponding to one virtual data stream, a precoding vector for each demodulation reference signal being the same as a precoding vector in the first precoding matrix adopted by the corresponding virtual data stream on a subcarrier where the demodulation reference signal is located, each demodulation reference signal and the corresponding virtual data stream being transmitted via a same antenna group; and a third transmission module configured to transmit M phase-tracking reference signals to the receiver, the M phase-tracking reference signals being adopted to track phase changes in the T antenna groups caused by one or more phase noise sources, M being an integer greater than or equal to 1.

In some possible embodiments of the present disclosure, each virtual data stream is precoded and then transmitted via one or more antenna groups, and the one or more antenna groups for the same virtual data stream have a same phase noise.

In some possible embodiments of the present disclosure, among the precoding vectors in the first precoding matrix adopted by each virtual data stream, apart from weight values corresponding to the one or more antenna groups for the virtual data stream, weight values corresponding to the antenna units or antenna ports in the other antenna groups are zero.

In some possible embodiments of the present disclosure, each phase-tracking reference signal is precoded and then transmitted via one or more antenna groups, and the one or more antenna groups for the same phase-tracking reference signal have a same phase noise.

In some possible embodiments of the present disclosure, among precoding vectors adopted by each phase-tracking reference signal, apart from weight values corresponding to one or more antenna groups adopted by the phase-tracking reference signal, weight values corresponding to the antenna units or antenna ports in the other antenna groups are zero.

In some possible embodiments of the present disclosure, information about the second precoding matrix is pre-agreed between the transmitter and the receiver, or the transmitter further includes: a fourth transmission module configured to transmit the information about the second precoding matrix to the receiver; or a fifth transmission module configured to transmit a rule adopted by the second precoding matrix on a data bandwidth to the receiver.

In some possible embodiments of the present disclosure, a mapping relationship between the demodulation reference signals and the phase-tracking reference signals is pre-agreed between the transmitter and the receiver, or the transmitter further includes a sixth transmission module configured to transmit the mapping relationship between the demodulation reference signals and the phase-tracking reference signals to the receiver.

In some possible embodiments of the present disclosure, in the mapping relationship between the demodulation reference signals and the phase-tracking reference signals, one phase-tracking reference signal at least corresponds to one demodulation reference signal, and each phase-tracking reference signal and the corresponding demodulation reference signal are transmitted via a same antenna group; and a precoding vector adopted by each phase-tracking reference signal is associated with a precoding vector in the first precoding matrix adopted by the corresponding virtual data stream on a subcarrier where the phase-tracking reference signal is located, and the virtual data stream corresponding to each phase-tracking reference signal corresponds to the demodulation reference signal corresponding to the phase-tracking reference signal.

In some possible embodiments of the present disclosure, when each phase-tracking reference signal corresponds to one demodulation reference signal, the precoding vector adopted by the phase-tracking reference signal is the same as the precoding vector in the first precoding matrix adopted by the corresponding virtual data stream on the subcarrier where the phase-tracking reference signal is located; and when each phase-tracking reference signal corresponds to a plurality of demodulation reference signals, the precoding vector adopted by the phase-tracking reference signal is calculated in accordance with the precoding vectors in the first precoding matrix adopted by a plurality of virtual data streams on the subcarrier where the phase-tracking reference signal is located, and the plurality of virtual data streams corresponds to the plurality of demodulation reference signals.

In still yet another aspect, the present disclosure provides in some embodiments a receiver, including: a first reception module configured to receive a data signal from a transmitter; a second reception module configured to receive demodulation reference signals from the transmitter, and estimate a channel for each demodulation reference signal, each antenna unit or antenna port of the receiver being configured to receive D demodulation reference signals, D being an integer greater than or equal to 1; a third reception module configured to receive phase-tracking reference signals from the transmitter, and estimate a channel for each phase-tracking reference signal, each antenna unit or antenna port of the receiver being configured to receive M phase-tracking reference signals, M being an integer greater than or equal to 1; a channel estimation module configured to, with respect to each antenna unit or antenna port, perform phase compensation on the estimated channels for the received D demodulation reference signals in accordance with the M phase-tracking reference signals received via the antenna unit or antenna port, so as to acquire a compensation channel estimation value for each demodulation reference signal on a symbol where the corresponding phase-tracking reference signal is located; an acquisition module configured to acquire channel information in accordance with a compensation channel estimation matrix and a second precoding matrix, the compensation channel estimation matrix including the compensation channel estimation value for each demodulation reference signal received via the antenna unit or antenna port on the symbol where the corresponding phase-tracking reference signal is located; and a demodulation module configured to demodulate the data signal in accordance with the channel information, so as to acquire user data.

In some possible embodiments of the present disclosure, the channel estimation module includes: a determination unit configured to, with respect to each antenna unit or antenna port, determine the demodulation reference signal corresponding to each phase-tracking reference signal received via the antenna unit or antenna port in accordance with a mapping relationship between the demodulation reference signals and the phase-tracking reference signals; a channel estimation unit configured to compare the estimated channel for each phase-tracking reference signal with the estimated channel for the corresponding demodulation reference signal, so as to acquire phase change information corresponding to the phase-tracking reference signal; and a compensation unit configured to perform phase noise compensation on the estimated channel for the corresponding demodulation reference signal in accordance with the phase change information corresponding to each phase-tracking reference signal, so as to acquire the compensation channel estimation value for each demodulation reference signal on the symbol where the corresponding phase-tracking reference signal is located.

In some possible embodiments of the present disclosure, the mapping relationship is pre-agreed between the transmitter and the receiver, or the receiver further includes a fourth reception module configured to receive the mapping relationship from the transmitter.

In some possible embodiments of the present disclosure, the acquisition module is further configured to multiply the compensation channel estimation matrix by the second precoding matrix so as to acquire the channel information.

In some possible embodiments of the present disclosure, information about the second precoding matrix is pre-agreed between the transmitter and the receiver, or the receiver further includes: a fifth reception module configured to receive the information about the second precoding matrix from the transmitter; or a sixth reception module configured to receive a rule adopted by the second precoding matrix on a data bandwidth from the transmitter, and acquire the second precoding matrix in accordance with the rule.

According to the embodiments of the present disclosure, the transmitter may precode the data stream for the user data through the second precoding matrix so as to acquire the D virtual data streams; precode the D virtual data streams through the first precoding matrix, and transmit the D precoded virtual data streams to the receiver via the T antenna groups, each antenna group including one or more antenna units or antenna ports having a same phase noise; transmit the D demodulation reference signals to the receiver, each demodulation reference signal corresponding to one virtual data stream, the precoding vector for each demodulation reference signal being the same as the precoding vector in the first precoding matrix adopted by the corresponding virtual data stream on the subcarrier where the demodulation reference signal is located, each demodulation reference signal and the corresponding virtual data stream being transmitted via the same antenna group; and transmit the M phase-tracking reference signals to the receiver, the M phase-tracking reference signals being adopted to track the phase changes in the T antenna groups caused by one or more phase noise sources. Due to the phase-tracking reference signal from the transmitter, it is able for the receiver to perform the phase compensation in accordance with the received phase-tracking reference signal, thereby to reduce the influence caused by the phase noise.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

Figure 1:
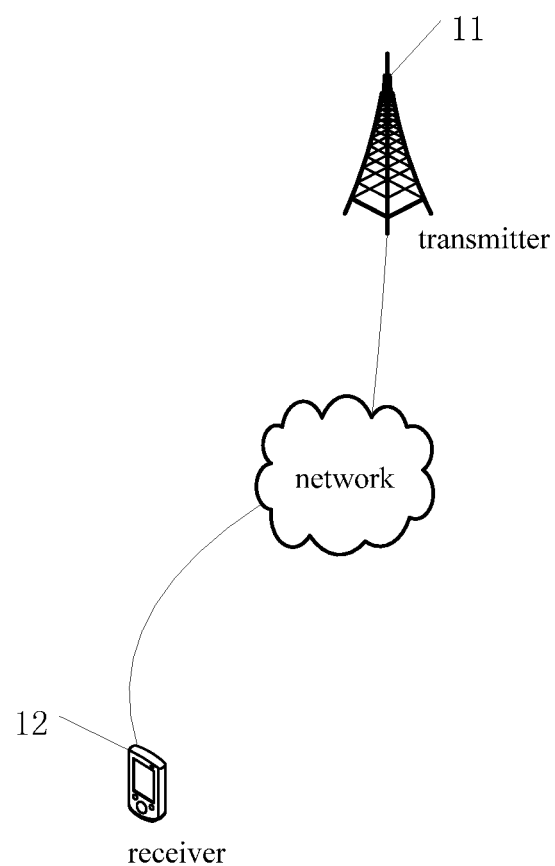
FIG. 1 is a schematic view showing a network according to one embodiment of the present disclosure.

FIG. 1 shows a network to which the scheme in the embodiments of the present disclosure is applicable. As shown in FIG. 1, the network includes a transmitter 11 and a receiver 12. The transmitter 11 may be understood as a device for transmitting (or sending) data, and the receiver 12 may be understood as a device for receiving data. In the drawings, the transmitter 11 is a network side device, and the receiver 12 is a User Equipment (UE). However, in other embodiments of the present disclosure, the transmitter 11 may also be a UE, and at this time, the receiver 12 may be a network side device or another UE. Further, when the transmitter 11 is a network side device, the receiver 12 may be a UE or another network side device. In addition, the UE may be a mobile phone, a tablet personal computer, a laptop computer, a personal digital assistant (PDA), a mobile Internet device (MID) or a wearable device. It should be appreciated that, the type of the transmitter 11 will not be particularly defined herein. The network side device may be a transmission reception point (TRP), a base station (e.g., a macro base station such as a Long Term Evolution (LTE) evolved Node B (eNB), a $5^{th}$-Generation (5G) New Radio (NR) NB), or an access point (AP). It should be further appreciated that, the type of the network side device will not be particularly defined herein.

Figure 2:
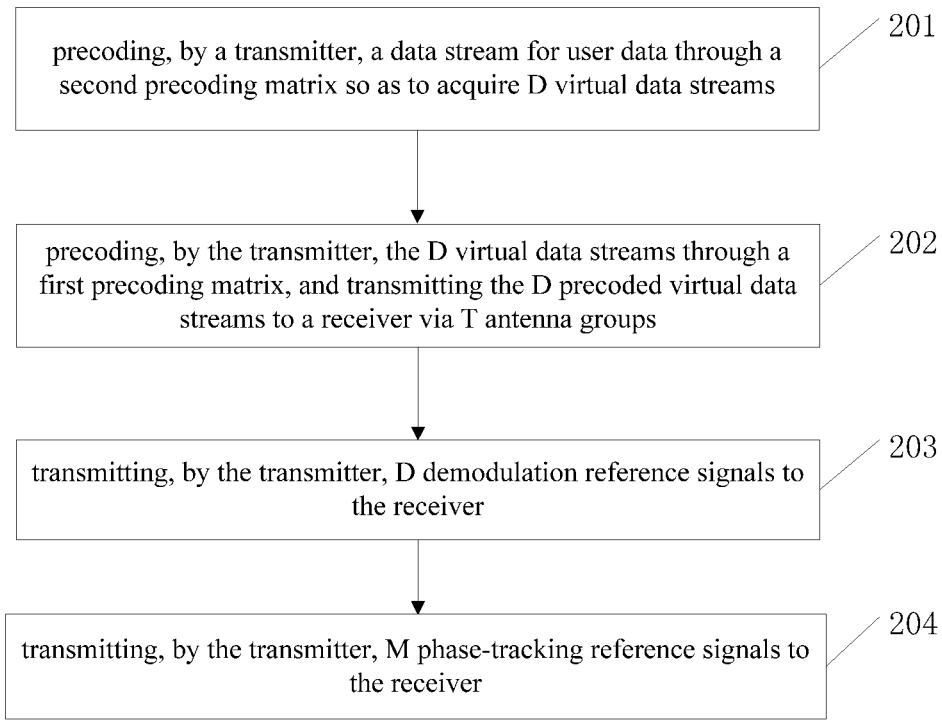
FIG. 2 is a flow chart of a reference signal transmission method according to one embodiment of the present disclosure.

The present disclosure provides in some embodiments a reference signal transmission method which, as shown in FIG. 2, includes: Step 201 of precoding, by a transmitter, a data stream for user data through a second precoding matrix so as to acquire D virtual data streams; Step 202 of precoding, by the transmitter, the D virtual data streams through a first precoding matrix, and transmitting the D precoded virtual data streams to a receiver via T antenna groups, each antenna group including one or more antenna units or antenna ports having a same phase noise, T being an integer greater than or equal to 1, D being an integer greater than or equal to 1; Step 203 of transmitting, by the transmitter, D demodulation reference signals (DMRSs) to the receiver, each demodulation reference signal corresponding to one virtual data stream, a precoding vector for each demodulation reference signal being the same as a precoding vector in the first precoding matrix adopted by the corresponding virtual data stream on a subcarrier where the demodulation reference signal is located, each demodulation reference signal and the corresponding virtual data stream being transmitted via a same antenna group; and Step 204 of transmitting, by the transmitter, M phase-tracking reference signals (PTRSs) to the receiver, the M phase-tracking reference signals being adopted to track phase changes in the T antenna groups caused by one or more phase noise sources, M being an integer greater than or equal to 1.

In the embodiments of the present disclosure, the user data may be any data capable of being transmitted between the transmitter and the receiver, e.g., uplink or downlink data.

According to the embodiments of the present disclosure, prior to the transmission of the data stream for the user data, the data stream may be encoded through the second precoding matrix so as to acquire the D virtual data streams. For example, R data streams for the user data may be encoded through the second precoding matrix so as to acquire the D virtual data streams. As a result, it is able to transmit the user data in a high-speed environment through the second precoding matrix in a round-robin manner, thereby to improve the transmission performance.

The D virtual data streams may be D data streams acquired after precoding the user data. In addition, D may be greater than or equal to T. Of course, D may also be smaller than T, i.e., a value of D will not be particularly defined herein.

In the embodiments of the present disclosure, antennae for the transmitter may be divided into T antenna groups in advance. The antenna units or antenna ports in each antenna group may have a same phase noise, and the antenna units or antenna ports in different antenna groups may have different phase noises. Of course, the antenna units or antenna ports in some antenna groups may also have the same phase noise, which will not be particularly defined herein. For example, when there are two antenna groups, the antenna units or antenna ports in an antenna group 1 may have a same phase noise, and the antenna units or antenna ports in an antenna group 2 may have a same phase noise which is different from the phase noise for the antenna units or antenna ports in the antenna group 1. When there are three antenna groups, the phase noise for the antenna units or antenna ports in the antenna group 1 may be different from a phase noise for the antenna units or antenna ports in an antenna group 3.

The transmitting the D precoded virtual data streams to the receiver via the T antenna groups may include transmitting the D virtual data streams precoded through the first precoding matrix to the receiver via the T antenna groups. Each virtual data stream may be transmitted through one or more antenna groups, and the one or more antenna groups through which the same virtual data stream is transmitted may have the same phase noise. In addition, the precoding vectors in the first precoding matrix adopted for the transmission of the virtual data streams through different antenna groups may be different, i.e., the precoding vector in the first precoding matrix for each virtual data stream may correspond to the antenna group through which the virtual data stream is transmitted.

The transmitting, by the transmitter, the D number of DMRSs to the receiver may include transmitting, by the transmitter, a DRMS corresponding to each virtual data stream to the receiver. The precoding vector for each DMRS may be the same as the precoding vector in the first precoding matrix adopted by the corresponding virtual data stream on the subcarrier where the DRMS is located, and each DMRS and the corresponding virtual data stream may be transmitted through the same antenna group. In other words, a precoding vector for an $i^{th}$ DMRS may be the same as a first precoding vector adopted by an $i^{th}$ virtual data stream on a subcarrier where the $i^{th}$ DMRS is located, and the $i^{th}$ DMRS and the $i^{th}$ virtual data stream may be transmitted through the same antenna group, where i is any integer from 1 to D. For example, when a DRMS 1 corresponds to a virtual data stream 1, an antenna group for the DMRS 1 may be the same as an antenna group for the virtual data stream 1, and a precoding vector for the DMRS 1 may be the same as a first precoding vector adopted by the virtual data stream 1 on a subcarrier where the DMRS 1 is located.

In the embodiments of the present disclosure, when the M number of PTRSs are adopted to track the phase changes in the T antenna groups caused by the one or more phase noise sources, each PTRS may correspond to one or more antenna groups and may be adopted to tract the phase change in the corresponding one or more antenna groups caused by one or more phase noise sources. In other words, upon the receipt of the M number of PTRSs, the receiver may estimate the phase noise for each antenna group. The phase noise for each antenna group may be understood as the phase change in a signal on different symbols when the signal is transmitted via the antenna group. It should be appreciated that, in the embodiments of the present disclosure, the PTRS will not be particularly defined. The PTRS may be any reference signal capable of tracking the phase change in each symbol transmitted through the antenna unit or antenna port. Similar to the DRMS, the PTRS may be adopted during the transmission of the user data, and transmitted after being precoded.

The transmitting, by the transmitter, the M number of PTRSs to the receiver may include transmitting each PTRS through one or more antenna groups, and the one or more antenna groups for the same PTRS may have a same phase noise. In this way, it is able for the receiver to perform phase compensation on an estimated channel for the DMRS transmitted through each antenna group in accordance with the received PTRS, acquire a compensation channel estimation value for each DRMS on a symbol where the corresponding PTRS is located, acquire channel information in accordance with the compensation channel estimation value, and demodulate a received data signal in accordance with the channel information so as to acquire the user data. As a result, it is able to reduce, and even eliminate, the influence of the phase noise on the user data, thereby to transmit the data accurately.

It should be appreciated that, in the embodiments of the present disclosure, an order of Steps 201 to 204 will not be particularly defined. As illustrated in the drawings, Steps 201 to 204 may be performed in sequence. In the embodiments of the present disclosure, Step 203 may be performed at first, then Steps 201 and 202 may be performed successively, and Step 204 may be performed simultaneously with Step 202. In addition, Steps 203 and 204 may be performed simultaneously, and then Steps 201 and 202 may be performed successively. The virtual data streams, the DRMSs and the PTRSs may be transmitted within a same subframe or a same slot, which will not be particularly defined herein.

A procedure implemented at the receiver will be described as follows.

At first, the receiver may receive a data signal from the transmitter.

Next, the receiver may receive the demodulation reference signals from the transmitter, and estimate a channel for each demodulation reference signal. Each antenna unit or antenna port of the receiver is configured to receive the D DMRSs, and D is an integer greater than or equal to 1.

Next, the receiver may receive the PTRSs from the transmitter, and estimate a channel for each phase-tracking reference signal. Each antenna unit or antenna port of the receiver is configured to receive the M PTRSs, and M is an integer greater than or equal to 1.

Next, with respect to each antenna unit or antenna port, the receiver may perform phase compensation on the estimated channels for the received D DMRSs in accordance with the M PTRSs received via the antenna unit or antenna port, so as to acquire a compensation channel estimation value for each demodulation reference signal on a symbol where the corresponding phase-tracking reference signal is located.

Next, the receiver may acquire channel information in accordance with a compensation channel estimation matrix and a second precoding matrix. The compensation channel estimation matrix may include the compensation channel estimation value for each demodulation reference signal received via the antenna unit or antenna port on the symbol where the corresponding phase-tracking reference signal is located.

Finally, the receiver may demodulate the data signal in accordance with the channel information, so as to acquire the user data.

The data signal may also be referred to as a signal received by the receiver, i.e., a signal received by the receiver after Step 201 is performed by the transmitter.

In addition, it should be appreciated that, the receiver may include a plurality of reception antenna units or antenna ports, but these antenna units or antenna ports may not be grouped, so at this time, the D number of DMRSs and the M number of PTRSs may be received via each antenna unit or antenna port. As a result, it is able to estimate the channel for each received DMRS and the channel for each received PTRS.

In this regard, with respect to each reception antenna unit or antenna port, it is able to perform the phase compensation on the estimated channels for the received D number of DMRSs in accordance with the M number of PTRSs received via the antenna unit or antenna port, thereby to acquire the compensation channel estimation value for each DMRS on the symbol where the corresponding PTRS is located. To be specific, the phase noise for the estimated channel for each DRMS may be estimated in accordance with the estimated channel for the corresponding PTRS, and then the phase compensation may be performed on the estimated channel for the DMRS in accordance with the estimated phase noise, so as to acquire the compensation channel estimation value for the DMRS on the symbol where the corresponding PTRS is located. The M number of PTRSs are adopted to track the phase changes in the T antenna groups caused by the one or more phase noise sources, and the DRMSs are transmitted via each antenna group, so there may exist the DRMS corresponding to each PTRS, so it is able to perform the phase compensation on the estimated channel for the DRMS in accordance with the corresponding PTRS, thereby to acquire the compensation channel estimation value for each DMRS on the symbol where the corresponding PTRS is located.

After the acquisition of the compensation channel estimation values for each DMRS on the symbol where the corresponding PTRS is located, the channel information may be acquired in accordance with the compensation channel estimation matrix and the acquired second precoding matrix. For example, the channel information may be acquired through a predetermined operation on the compensation channel estimation matrix and the acquired second precoding matrix, and the predetermined operation may include, but not limited to, multiplying the compensation channel estimation matrix by the acquired second precoding matrix. In this way, when the data signal is demodulated in accordance with the channel information, it is able to eliminate the influence of the phase noise on the user data. In addition, the channel information may be understood as complete channel information experienced by the user data, and it may be represented as a matrix. The receiver may demodulate the data signal in accordance with the channel information to acquire the user data, so it is able to reduce, or even eliminate, the influence of the phase noise on the user data, thereby to transmit the data accurately.

It should be appreciated that, in the embodiments of the present disclosure, although as mentioned hereinabove, in order to emphasize a reception operation at the receiver, the reception antenna units or antenna ports are adopted for receiving data, the reception antenna units or antenna ports may also be adopted for transmitting data.

In some possible embodiments of the present disclosure, each virtual data stream may be precoded and then transmitted via one or more antenna groups, and the one or more antenna groups for the same virtual data stream may have a same phase noise.

In the embodiments of the present disclosure, when the same virtual data stream is transmitted via the one or more antenna groups having the same phase noise, it is able to facilitate the phase compensation at the receiver, thereby to further eliminate the influence of the phase noise.

In addition, in the embodiments of the present disclosure, the first precoding vector for each virtual data stream may correspond to the antenna group via which the virtual data stream is transmitted. For example, when the virtual data stream 1 is transmitted via the antenna group 1, the first precoding vector for the virtual data stream 1 may correspond to the antenna group 1. When the virtual data stream 2 is transmitted via the antenna group 2, the first precoding vector for the virtual data stream 2 may correspond to the antenna group 2. When the first precoding vector for each virtual data stream corresponds to the respect antenna group, the phase noise for each virtual data stream may be just the phase noise caused by the corresponding antenna group, without any interference from the other antenna groups.

In some possible embodiments of the present disclosure, among the precoding vectors in the first precoding matrix adopted by each virtual data stream, apart from weight values corresponding to the one or more antenna groups for the virtual data stream, weight values corresponding to the antenna units or antenna ports in the other antenna groups may be zero.

In the embodiments of the present disclosure, it is able to provide the precoding vectors in the first precoding matrix adopted by each virtual data stream, apart from the weight values corresponding to the one or more antenna groups for the virtual data stream, with the weight values corresponding to the antenna units or antenna ports in the other antenna groups as zero. In other words, when each virtual data stream is precoded in Step 202, apart from the weight value corresponding to the antenna group via which the virtual data stream is transmitted, the weight values corresponding to the other antenna units or antenna ports for the precoding vectors in the first precoding matrix may be zero. The weight value corresponding to the antenna group via which the virtual data stream is transmitted for the precoding vector in the first precoding matrix is just the weight value corresponding to the antenna units or antenna ports in the antenna group, and this weight value may be received from the receiver or determined by the transmitter in accordance with uplink/downlink reciprocity. In this way, each virtual data stream may merely be influenced by the phase noise for the antenna group via which the virtual data stream is transmitted. The corresponding PTRS may be transmitted via each antenna group, so it is able for the receiver to estimate the phase noise for each DMRS, thereby to eliminate the influence of the phase noise on the user data.

In some possible embodiments of the present disclosure, each phase-tracking reference signal may be precoded and then transmitted via one or more antenna groups, and the one or more antenna groups for the same phase-tracking reference signal may have a same phase noise.

In the embodiments of the present disclosure, each PTRS may be transmitted via one or more antenna groups having the same phase noise. In this way, it is able to track the phase noise introduced by one phase noise source through one PTRS and facilitate the receiver to estimate the phase change in each antenna group, thereby to further eliminate the influence of the phase noise.

In some possible embodiments of the present disclosure, among precoding vectors adopted by each phase-tracking reference signal, apart from weight values corresponding to one or more antenna groups adopted by the phase-tracking reference signal, weight values corresponding to the antenna units or antenna ports in the other antenna groups may be zero.

In the embodiments of the present disclosure, it is able to provide the precoding vectors adopted by each PTRS, apart from the weight values corresponding to the one or more antenna groups via which the PTRS is transmitted, with the weight values corresponding to the antenna units or antenna ports in the other antenna groups as zero. In other words, when each PTRS is precoded, apart from the weight value corresponding to the antenna group via which the PTRS is transmitted, the weight values corresponding to the other antenna units or antenna ports for the precoding vectors may be zero. The weight value corresponding to the antenna group via which the PTRS is transmitted for the precoding vector is just the weight value corresponding to the antenna units or antenna ports in the antenna group, and this weight value may be received from the receiver or determined by the transmitter in accordance with uplink/downlink reciprocity. In this way, each PTRS may merely be influenced by the phase noise for the antenna group via which the PTRS is transmitted, so it is able to track the phase change in the antenna group via which the PTRS is transmitted, thereby to eliminate the influence of the phase noise on the user data.

In some possible embodiments of the present disclosure, information about the second precoding matrix may be pre-agreed between the transmitter and the receiver. Alternatively, the reference signal transmission method may further include: transmitting, by the transmitter, the information about the second precoding matrix to the receiver; or transmitting, by the transmitter, a rule adopted by the second precoding matrix on a data bandwidth to the receiver.

In the embodiments of the present disclosure, the transmitter may notify the receiver of the second precoding matrix through high-layer signaling or dynamic control signaling, and notify the receiver of the rule adopted by the second precoding matrix on the data bandwidth so as to enable the receiver to acquire the second precoding matrix in accordance with the rule. Alternatively, the information about the second precoding matrix may also be pre-agreed between the transmitter and the receiver. In addition, in the embodiments of the present disclosure, the second precoding matrix maybe a precoding matrix adopted by the transmitter on all the data bandwidths, and thereby the second precoding matrix notified by the transmitter to the receiver may also be the precoding matrix adopted on all the data bandwidths.

In addition, in the embodiments of the present disclosure, when the information about the second precoding matrix is pre-agreed, it is unnecessary for the transmitter to transmit the information about the second precoding matrix as well as the rule adopted by the second precoding matrix on the data bandwidth to the receiver, so it is able to reduce the transmission overhead. When the information about the second precoding matrix is not pre-agreed, it is necessary for the transmitter to transmit the information about the second precoding matrix as well as the rule adopted by the second precoding matrix on the data bandwidth to the receiver. In this way, the transmitter may determine the second precoding matrix as well as the rule adopted by the second precoding matrix on the data bandwidth, so it is able to select the second precoding matrix flexibly, thereby to meet the service requirement in a better manner and improve the service performance.

In some possible embodiments of the present disclosure, a mapping relationship between the DMRSs and the PTRSs may be pre-agreed between the transmitter and the receiver. Alternatively, the reference signal transmission method may further include transmitting, by the transmitter, the mapping relationship between the DMRSs and the PTRSs to the receiver.

The transmitter may notify the receiver of the mapping relationship between the PTRSs and the DMRSs through high-layer signaling or dynamic control signaling. To be specific, the mapping relationship may be a mapping relationship between PTRS ports and DMRS ports. The PTRSs and the DMRSs are all transmitted via ports, so when there is the mapping relationship between the PTRS ports and the DMRS ports, they may exist the mapping relationship between the PTRSs and the DMRSs. In addition, in the embodiments of the present disclosure, one PTRS may also be understood as a PTRS port, and one DMRS may also be understood as a DMRS port.

In addition, in the embodiments of the present disclosure, when the mapping relationship is pre-agreed between the transmitter and the receiver, it is unnecessary for the transmitter to transmit the mapping relationship to the receiver, so it is able to reduce the transmission overhead. When the mapping relationship is not pre-agreed, it is necessary for the transmitter to transmit the mapping relationship to the receiver. In this way, the transmitter may determine the mapping relationship, so it is able to select the mapping relationship flexibly, thereby to meet the service requirement in a better manner and improve the service performance.

In addition, in the embodiments of the present disclosure, upon the receipt of the mapping relationship, the receiver may accurately determine the DMRS corresponding to each PTRS, and perform the phase compensation on the estimated channel for each DRMS in accordance with the estimated channel for the corresponding PTRS, so as to eliminate the influence of the phase noise caused by each DRMS.

For example, with respect to each antenna unit or antenna port, the receiver may determine the DRMS corresponding to each PTRS received via the antenna unit or antenna port in accordance with the acquired mapping relationship between the DMRSs and the PTRSs, compare the estimated channel for each PTRS with the estimated channel for the corresponding DRMS to acquire phase change information corresponding to the PTRS, and perform the phase noise compensation on the estimated channel for the corresponding DMRS in accordance with the phase change information corresponding to each PTRS, so as to acquire the compensation channel estimation value for each DRMS on the symbol where the corresponding PTRS is located.

For example, when one PTRS is received via one antenna port, the receiver may determine the DRMS signal corresponding to the received PTRS in accordance with the mapping relationship, and compare the estimated channel for the PTRS with the estimated channel for the DMRS corresponding to the PTRS, so as to acquire the phase change information corresponding to the PTRS. The phase change information may be understood as a phase noise estimation value. Upon the acquisition of the phase change information corresponding to the PTRS, the receiver may perform the phase noise compensation on the estimated channel for the corresponding DMRS in accordance with the phase change information, so as to acquire the compensation channel estimation value for each DMRS on the symbol where the corresponding PTRS is located. For example, the phase change information may be multiplied by the estimated channel for the DMRS, so as to acquire the compensation channel estimation value for the DMRS on the symbol where the corresponding PTRS is located.

In some possible embodiments of the present disclosure, in the mapping relationship between the DMRSs and the PTRSs, one PTRS may at least correspond to one DMRS, and each PTRS and the corresponding DMRS may be transmitted via a same antenna group; and a precoding vector adopted by each PTRS may be associated with a precoding vector in the first precoding matrix adopted by the corresponding virtual data stream on a subcarrier where the PTRS is located, and the virtual data stream corresponding to each PTRS may correspond to the DMRS corresponding to the PTRS.

In the embodiments of the present disclosure, one PTRS may at least correspond to one DMRS, and each PTRS and the corresponding DMRS may be transmitted via the same antenna group, so it is able for the receiver to accurately perform the phase compensation on the estimated channel for the DMRS in accordance with the estimated channel for the corresponding PTRS.

In addition, the precoding vector adopted by each PTRS may be associated with the precoding vector in the first precoding matrix adopted by the corresponding virtual data stream on the subcarrier where the PTRS is located, so it is able for the receiver to demodulate the received data signal in accordance with information about the estimated channel for the PTRS, thereby to further eliminate the influence of the phase noise on the user data.

In some possible embodiments of the present disclosure, when each phase-tracking reference signal corresponds to one demodulation reference signal, the precoding vector adopted by the phase-tracking reference signal may be the same as the precoding vector in the first precoding matrix adopted by the corresponding virtual data stream on the subcarrier where the phase-tracking reference signal is located; and when each phase-tracking reference signal corresponds to a plurality of demodulation reference signals, the precoding vector adopted by the phase-tracking reference signal may be calculated in accordance with the precoding vectors in the first precoding matrix adopted by a plurality of virtual data streams on the subcarrier where the phase-tracking reference signal is located, and the plurality of virtual data streams may correspond to the plurality of demodulation reference signals.

In the embodiments of the present disclosure, when each PTRS corresponds to one DMRS, the precoding vector adopted by the PTRS may be the same as the precoding vector in the first precoding matrix adopted by the corresponding virtual data stream on the subcarrier where the PTRS is located. In this way, the channels experienced by each PTRS and the corresponding virtual data stream may have same characteristic, so it is able for the receiver to demodulate the received data signal in accordance with the information about the estimated channel for the PTRS, thereby to further eliminate the influence of the phase noise on the user data. In addition, during the calculation, the precoding vectors in the first precoding matrix adopted by the plurality of virtual data streams on the subcarrier where the PTRS is located may be subjected to a predetermined operation, e.g., an addition operation, which will not be particularly defined herein.

It should be appreciated that, the above embodiments may be implemented in a combined or separate manner, which will not be particularly defined herein.

Example 1

Presumed that the quantity of the data streams to be transmitted is 2 (R=2), first N1 antenna units or antenna ports of an antenna array for the transmitter (which have a same phase noise) form a first group, and the remaining N−N1 antenna units or antenna ports (which have a same phase noise different from that of the first group) form a second group (i.e., T=2), at this time, two PTRS ports (i.e., M=2) need to be provided. The receiver may receive the data streams via two antenna units or antenna ports. When two DMRS ports need to be provided (i.e., D=2), a subframe configuration for the reference signals may be shown in FIG. 3. The DMRS may be located at a third Orthogonal Frequency Division Multiplexing (OFDM) symbol, and may include two ports, i.e., it may be multiplexed in a frequency-division manner in the OFDM symbol. Each PTRS may occupy one subcarrier (a PTRS port 1 may be configured on a fifth subcarrier, and a PTRS port 2 may be configured on a fourth subcarrier), and it may be transmitted successively on the fourth to fourteenth symbols. First and second OFDM symbols may be adopted for control channels, and the others may be adopted for the user data.

At a Transmitter (e.g., Base Station) Side

Presumed that a second precoding matrix set in a system includes S number of second precoding matrices, the second precoding matrix set may be known to both the transmitter and the receiver. As configured at the base station side, the second precoding matrix in the second precoding matrix set corresponding to index values of mod (k,S) may be adopted on a $k^{th}$ subcarrier in the data bandwidth, where mod represents a modulus operation.

The two data streams (R=2) for the user data may be precoded by a second precoding matrix W2 having D*R dimensions, i.e., $$W_2^k = \begin{bmatrix} v_{1,1}^k & v_{2,1}^k \\ v_{1,2}^k & v_{2,2}^k \end{bmatrix},$$

so as to acquire two virtual data streams, i.e., a first virtual data stream and a second virtual data stream. This precoding matrix may be selected by the base station from a predetermined precoding matrix set.

The first virtual data stream may be transmitted via the first N1 antenna units or antenna ports for the transmitter, and the second virtual data stream may be transmitted via the remaining N−N1 antenna units or antenna ports. At this time, a first precoding matrix adopted by the two virtual data streams may be represented as $$W_1^k = [w_1^k \ w_2^k] = \begin{bmatrix} w_{1,1}^k & 0 \\ 0 & w_{2,2}^k \end{bmatrix},$$

where $w_{1,1}^k$ is a column vector of $N_1 \times 1$ and corresponds to a weight value for the first N1 antenna units or antenna ports in the precoding vectors adopted by the first virtual data stream, and $w_{2,2}^k$ is a column vector of $(N−N_1) \times 1$ and corresponds to a weight value for the remaining N−N1 antenna units or antenna ports in the precoding vectors adopted by the second virtual data stream.

Figure 3:
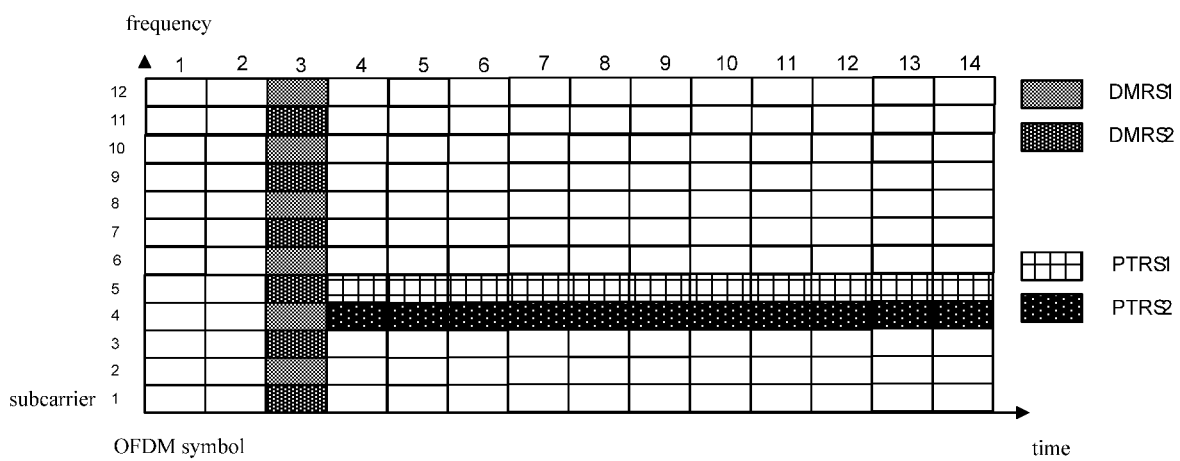
FIG. 3 is a schematic view showing the distribution of subcarriers for reference signals according to one embodiment of the present disclosure.

The DMRS port 1 may be transmitted via the first N1 antenna units or antenna ports for the transmitter, and as shown in FIG. 3, it may be distributed on a subcarrier d1 (d1=2, 4, 6, 8, 10, 12). The DMRS1 on the subcarrier d1 may be precoded through a same precoding matrix $$w_1^{d_1} = \begin{bmatrix} w_{1,1}^{d_1} \\ 0 \end{bmatrix}$$

as the first virtual data stream on the subcarrier d1. The DMRS port 2 may be transmitted via the N−N1 antenna units or antenna ports for the transmitter, and as shown in FIG. 3, it may be distributed on a subcarrier d2 (d2=1, 3, 5, 7, 9, 11). The DMRS2 on the subcarrier d2 may be precoded through a same precoding matrix $$w_2^{d_2} = \begin{bmatrix} 0 \\ w_{2,2}^{d_2} \end{bmatrix}$$

as the second virtual data stream on the subcarrier d2.

The two PTRS ports may be adopted to estimate two phase noises respectively. The PTRS port 1 may be precoded through $$w_1^5 = \begin{bmatrix} w_{1,1}^5 \\ 0 \end{bmatrix},$$

and the PTRS port 2 may be precoded through $$w_2^4 = \begin{bmatrix} 0 \\ w_{2,2}^4 \end{bmatrix}.$$

Figure 4:
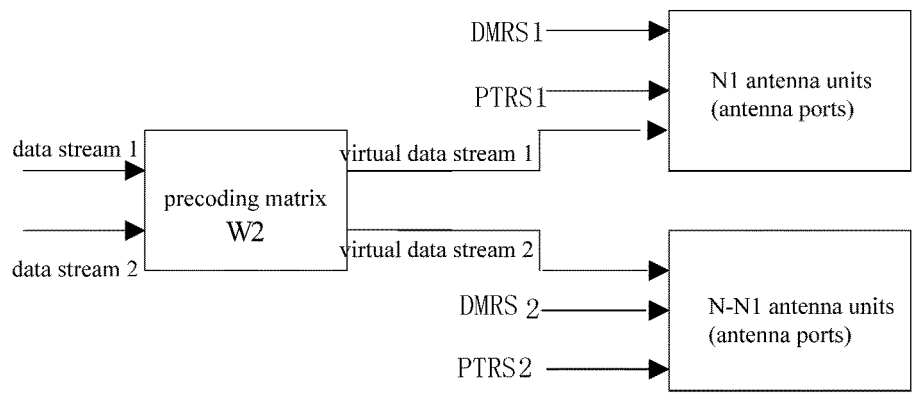
FIG. 4 is a schematic view showing the signal transmission according to one embodiment of the present disclosure.

FIG. 4 shows the data transmission.

The base station may notify a terminal of information about the mapping of PTRS1 to DMRS1 and the mapping of PTRS2 to DMRS2 through high-layer signaling or dynamic control signaling. In addition, the base station may also notify the terminal that the first virtual data stream has been mapped to the DMRS port 1 and the second virtual data stream has been mapped to the DMRS port 2 through the high-layer signaling or dynamic control signaling.

The base station may notify the terminal of an index of the second precoding matrix adopted on each subcarrier in the second precoding matrix set through the high-layer signaling.

At a Receiver (e.g., Terminal (UE)) Side

Presumed that the two antenna units or antenna ports for the receiver have different phase noises, a data signal received on a $k^{th}$ subcarrier of an $l^{th}$ symbol may be represented as $Y_{k,l} = P_{k,l}^r \cdot H_{k,l} \cdot P_{k,l}^t \cdot w_{k,l} \cdot x_{k,l}$ and further represented as $$\begin{bmatrix} y_1^{k,l} \\ y_2^{k,l} \end{bmatrix} =$$

$$\begin{bmatrix} e^{j\phi_l^0} & 0 \\ 0 & e^{j\phi_l^1} \end{bmatrix}_{2\times 2} \cdot \begin{bmatrix} H_{1,1}^k & H_{1,2}^k \\ H_{2,1}^k & H_{2,2}^k \end{bmatrix}_{2\times N} \cdot \begin{bmatrix} e^{j\theta_l^0} & & & 0 \\ & \ddots & & \\ & & e^{j\theta_l^0} & \\ & & & e^{j\theta_l^1} \\ & & & & \ddots \\ 0 & & & & e^{j\theta_l^1} \end{bmatrix}_{N\times N}$$

$$\begin{bmatrix} w_{1,1}^k & 0 \\ 0 & w_{2,2}^k \end{bmatrix}_{N\times 2} \cdot \begin{bmatrix} v_{1,1}^k & v_{2,1}^k \\ v_{1,2}^k & v_{2,2}^k \end{bmatrix}_{2\times 2} \cdot \begin{bmatrix} x_1^{k,l} \\ x_2^{k,l} \end{bmatrix}_{2\times 1}.$$

Here, the channel $H_{k,l}$ and the precoding matrix $w_{k,l}$ may remain unchanged in one time unit (e.g., subframe). For the transmitter, on a diagonal line of a phase noise matrix, $e^{j\theta_l^0}$ may include N1 elements, and $e^{j\theta_l^1}$ may include N−N1 elements.

The receiver may receive the DMRS on the third OFDM symbol. Taking a first reception antenna unit or antenna port as an example, a combined channel $e^{j\Phi_3^0} \cdot H_{1,1}^k \cdot e^{j\Theta_3^0} \cdot w_{1,1}^k$ may be estimated through the DMRS port 1, and a combined channel $e^{j\Phi_3^0} \cdot H_{1,2}^k \cdot e^{j\Theta_3^1} \cdot w_{2,2}^k$ may be estimated through the DMRS port 2. On the symbol where the DMRS is located, based on the hypothesis in FIG. 2, the channels for all subcarriers may be estimated through channel interpolation. Here, k=1, 2, . . . , 12.

The receiver may receive the two-port PTRS from the fourth OFDM symbol, estimate $e^{j\Phi_l^0} \cdot H_{1,1}^5 \cdot e^{j\Theta_l^0} \cdot w_{1,1}^5$ through the PTRS port 1, and estimate $e^{j\Phi_l^0} \cdot H_{1,2}^4 \cdot e^{j\Theta_l^1} \cdot w_{2,2}^4$ through the PTRS port 2, where l≥4.

The receiver may receive information about the mapping relationship between PTRS1-2 and DMRS1-2 notified by the transmitter through signaling, and divide a channel estimation result for PTRS1 by a channel estimation result for DMRS1 in accordance with the information, so as to acquire a phase change $$e^{j\Phi_l^0} = \frac{e^{j\phi_l^0} \cdot H_{1,1}^5 \cdot e^{j\theta_l^0} \cdot w_{1,1}^5}{e^{j\phi_3^0} \cdot H_{1,1}^5 \cdot e^{j\theta_3^0} \cdot w_{1,1}^5}$$

in a first symbol transmitted via the first antenna unit or antenna port relative to a third symbol transmitted via a first group of antenna units or antenna ports for the transmitter, and acquire a phase change $$e^{j\Phi_l^1} = \frac{e^{j\phi_l^0} \cdot H_{1,2}^4 \cdot e^{j\theta_l^1} \cdot w_{2,2}^4}{e^{j\phi_3^0} \cdot H_{1,2}^4 \cdot e^{j\theta_3^1} \cdot w_{2,2}^4}$$

in the first symbol transmitted via the first antenna unit or antenna port relative to the third symbol transmitted via a second group of antenna units or antenna ports for the transmitter. Based on these, it is able to acquire channel estimation values $e^{j\Phi_3^0} \cdot H_{1,1}^k \cdot e^{j\Theta_3^0} \cdot w_{1,1}^k \cdot e^{j\Phi_l^0}$ and $e^{j\Phi_3^0} \cdot H_{1,2}^k \cdot e^{j\Theta_3^1} \cdot w_{2,2}^k \cdot e^{j\Phi_l^1}$ on the k subcarrier of the $l^{th}$ symbol transmitted via the first reception antenna unit or antenna port.

Similarly, it is able to acquire channel estimation values $e^{j\Phi_3^1} \cdot H_{2,1}^k \cdot e^{j\Theta_3^0} \cdot w_{1,1}^k \cdot e^{j\Phi_l^0}$ and $e^{j\Phi_3^1} \cdot H_{2,2}^k \cdot e^{j\Theta_3^1} \cdot w_{2,2}^k \cdot e^{j\Phi_l^1}$ on the $k^{th}$ subcarrier of the $l^{th}$ symbol transmitted via the second reception antenna unit or antenna port.

The receiver may determine the second precoding matrix in the second precoding matrix set to be adopted on the kth subcarrier in accordance with the indices of the second precoding matrices notified by the transmitter through signaling, and multiply the channel matrices estimated for all the antenna groups by the determined second precoding matrix, so as to acquire the following complete channel information experienced by the user data:

$$\begin{bmatrix} e^{j\phi_3^0} \cdot H_{1,1}^k \cdot e^{j\theta_3^0} \cdot w_{1,1}^k \cdot e^{j\phi_l^0} & e^{j\phi_3^0} \cdot H_{1,2}^k \cdot e^{j\theta_3^1} \cdot w_{2,2}^k \cdot e^{j\phi_l^1} \\ e^{j\phi_3^1} \cdot H_{2,1}^k \cdot e^{j\theta_3^0} \cdot w_{1,1}^k \cdot e^{j\phi_l^0} & e^{j\phi_3^1} \cdot H_{2,2}^k \cdot e^{j\theta_3^1} \cdot w_{2,2}^k \cdot e^{j\phi_l^1} \end{bmatrix} \cdot \begin{bmatrix} v_{1,1}^k & v_{2,1}^k \\ v_{1,2}^k & v_{2,2}^k \end{bmatrix}.$$

Then, the receiver may demodulate the user data for each data stream in accordance with the complete channel information. The user data for the data stream transmitted on the other subcarriers may be acquired in a similar manner, which will not be particularly defined herein.

Presumed that the quantity of the data streams to be transmitted is 3 (R=3), first N1 antenna units or antenna ports of an antenna array for the transmitter (which have a same phase noise) form a first group, and the remaining N−N1 antenna units or antenna ports (which have a same phase noise different from that of the first group) form a second group (i.e., T=2), at this time, two PTRS ports (i.e., M=2) need to be provided. When four DMRS ports need to be provided (i.e., D=4), the receiver may receive the data streams via four antenna units or antenna ports, and a subframe configuration for the reference signals may be shown in FIG. 5. The DMRS may be located at a third OFDM symbol, and may include four ports, i.e., it may be multiplexed in a frequency-division manner in the OFDM symbol. Each PTRS may occupy one subcarrier (a PTRS port 1 may be configured on a fifth subcarrier, and a PTRS port 2 may be configured on a fourth subcarrier), and it may be transmitted successively on the fourth to fourteenth symbols. First and second OFDM symbols may be adopted for control channels, and the others may be adopted for the user data.

At a Transmitter (e.g., Base Station) Side

Presumed that a second precoding matrix set in a system includes S second precoding matrices, the second precoding matrix set may be known to the transmitter and the receiver. As pre-agreed by the base station side with a terminal side, the second precoding matrix in the second precoding matrix set corresponding to index values of mod (k,S) may be adopted on a $k^{th}$ subcarrier in the data bandwidth, where mod represents a modulus operation.

Taking a $k^{th}$ subcarrier an example, the three data streams (R=3) for the user data may be precoded by a second precoding matrix W2 having D*R dimensions, i.e., $$W_2^k = \begin{bmatrix} v_{1,1}^k & v_{2,1}^k & v_{3,1}^k \\ v_{1,2}^k & v_{2,2}^k & v_{3,2}^k \\ v_{1,3}^k & v_{2,3}^k & v_{3,3}^k \\ v_{1,4}^k & v_{2,4}^k & v_{3,4}^k \end{bmatrix},$$

so as to acquire four virtual data streams, i.e., first to fourth virtual data streams.

The first and second virtual data streams may be transmitted via the first N1 antenna units or antenna ports for the transmitter, and the third and fourth virtual data streams may be transmitted via the N−N1 antenna units or antenna ports. At this time, a first precoding matrix adopted by the four virtual data streams may be represented as $$W_1^k = [w_1^k \ w_2^k \ w_3^k \ w_4^k] = \begin{bmatrix} w_{1,1}^k & w_{2,1}^k & 0 & 0 \\ 0 & 0 & w_{3,2}^k & w_{4,2}^k \end{bmatrix},$$

where $w_{1,1}^k$ and $w_{2,1}^k$ each represent a column vector of $N_1 \times 1$ and each correspond to weight values for the first N1 antenna units or antenna ports in the precoding vectors adopted by the first and second virtual data streams respectively, and $w_{3,2}^k$ and $w_{4,2}^k$ each represent a column vector of $(N-N_1) \times 1$ and each correspond to weight values for the remaining N−N1 antenna units or antenna ports in the precoding vectors adopted by the third and fourth virtual data streams respectively.

Figure 5:
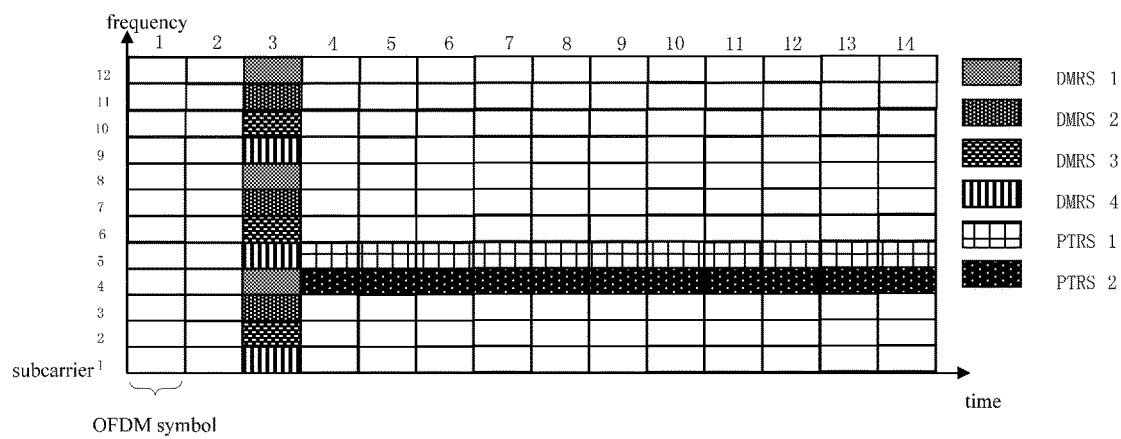
FIG. 5 is another schematic view showing the distribution of the subcarriers for the reference signals according to one embodiment of the present disclosure.

The DMRS port 1 may be transmitted via the first N1 antenna units or antenna ports for the transmitter, and as shown in FIG. 5, it may be distributed on a subcarrier d1 (d1=4, 8, 12). The DMRS1 on the subcarrier d1 may be precoded through a same precoding matrix $$w_1^{d_1} = \begin{bmatrix} w_{1,1}^{d_1} \\ 0 \end{bmatrix}$$

as the first virtual data stream on the subcarrier d1. The DMRS port 2 may also be transmitted via the first N1 antenna units or antenna ports for the transmitter, and it may be distributed on a subcarrier d2 (d2=3, 7, 11). The DMRS2 on the subcarrier d2 may be precoded through a same precoding matrix $$w_2^{d_2} = \begin{bmatrix} w_{2,1}^{d_2} \\ 0 \end{bmatrix}$$

as the second virtual data stream on the subcarrier d2. Both the DMRS port 3 and the DMRS port 4 may be transmitted via the N−N1 antenna units or antenna ports for the transmitter. The DMRS3 may be distributed on a subcarrier d3 (d3=2, 6, 10), and the DMRS4 may be distributed on a subcarrier d4 (d4=1, 5, 9). The DMRS3 and the DMRS4 may be precoded through a same precoding matrix $$w_3^{d_3} = \begin{bmatrix} 0 \\ w_{3,2}^{d_3} \end{bmatrix}$$

as the third virtual data stream on the subcarrier d3 and a same precoding matrix $$w_4^{d_4} = \begin{bmatrix} 0 \\ w_{4,2}^{d_4} \end{bmatrix}$$

as the fourth virtual data stream on the subcarrier d4 respectively.

The two PTRS ports may be adopted to estimate two phase noises respectively. The PTRS port 1 may be precoded through $$w_1^5 + w_2^5 = \begin{bmatrix} w_{1,1}^5 + w_{2,1}^5 \\ 0 \end{bmatrix},$$

and the PTRS port 2 may be precoded through $$w_3^4 + w_4^4 = \begin{bmatrix} 0 \\ w_{3,2}^4 + w_{4,2}^4 \end{bmatrix}.$$

Figure 6:
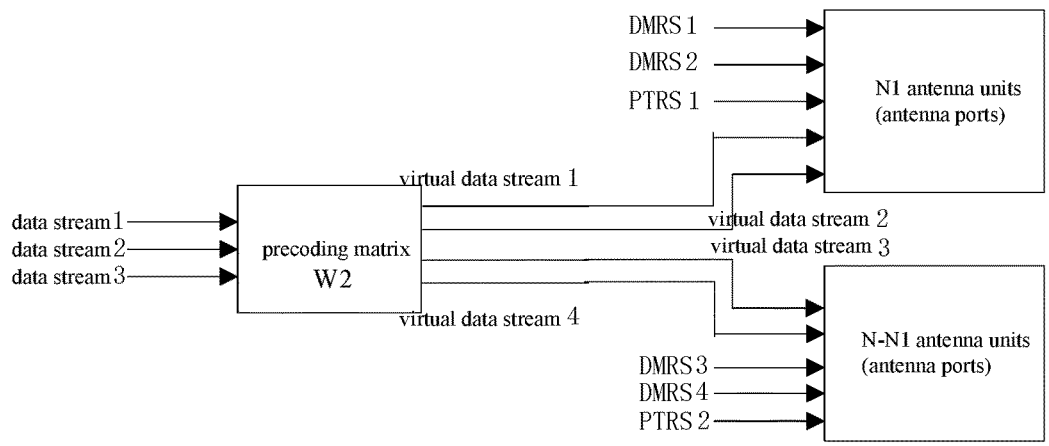
FIG. 6 is another schematic view showing the signal transmission according to one embodiment of the present disclosure.

FIG. 6 shows the data transmission.

The base station may notify a terminal of information about the mapping of PTRS1 to DMRS1 and the mapping of PTRS2 to DMRS2 and DMRS3 through high-layer signaling or dynamic control signaling.

At a Receiver (e.g., Terminal) Side

A data signal received on a $k^{th}$ subcarrier of an $l^{th}$ symbol may be represented as $Y_{k,l}=P_{k,l}^r \cdot H_{k,l} \cdot P_{k,l}^t \cdot w_{k,l} \cdot x_{k,l}$, and further represented as $$\begin{bmatrix} y_1^{k,l} \\ y_2^{k,l} \\ y_3^{k,l} \\ y_4^{k,l} \end{bmatrix} = \begin{bmatrix} e^{j\phi_l^0} & & & \\ & e^{j\phi_l^1} & & \\ & & e^{j\phi_l^2} & \\ & & & e^{j\phi_l^3} \end{bmatrix}_{4\times 4}$$

$$\begin{bmatrix} H_{1,1}^k & H_{1,2}^k \\ H_{2,1}^k & H_{2,2}^k \\ H_{3,1}^k & H_{3,2}^k \\ H_{4,1}^k & H_{4,2}^k \end{bmatrix}_{4\times N} \cdot \begin{bmatrix} e^{j\theta_l^0} & & & & 0 \\ & \ddots & & & \\ & & e^{j\theta_l^0} & & \\ & & & e^{j\theta_l^1} & \\ & & & & \ddots \\ 0 & & & & e^{j\theta_l^1} \end{bmatrix}_{N\times N}$$

$$\begin{bmatrix} w_{1,1}^k & w_{2,1}^k & 0 & 0 \\ 0 & 0 & w_{3,2}^k & w_{4,2}^k \end{bmatrix}_{N\times 4} \cdot \begin{bmatrix} v_{1,1}^k & v_{2,1}^k & v_{3,1}^k \\ v_{1,2}^k & v_{2,2}^k & v_{3,2}^k \\ v_{1,3}^k & v_{2,3}^k & v_{3,3}^k \\ v_{1,4}^k & v_{2,4}^k & v_{3,4}^k \end{bmatrix}_{4\times 3} \cdot \begin{bmatrix} x_1^{k,l} \\ x_2^{k,l} \\ x_3^{k,l} \end{bmatrix}_{3\times 1}$$

Here, the channel $H_{k,l}$ and the precoding matrix $w_{k,l}$ may remain unchanged in one time unit (e.g., subframe). For the transmitter, on a diagonal line of a phase noise matrix, $e^{j\Theta_l^0}$ may include N1 elements, and $e^{j\Theta_l^1}$ may include N−N1 elements.

The receiver may receive the DMRS on the third OFDM symbol. Taking a second reception antenna unit or antenna port as an example, a combined channel $e^{j\Phi_3^1} \cdot H_{2,1}^k \cdot e^{j\Theta_3^0} \cdot w_{1,1}^k$ may be estimated through the DMRS port 1, a combined channel $e^{j\Phi_3^1} \cdot H_{2,1}^k \cdot e^{j\Theta_3^0} \cdot w_{2,1}^k$ may be estimated through the DMRS port 2, a combined channel $e^{j\Phi_3^1} \cdot H_{2,2}^k \cdot e^{j\Theta_3^1} \cdot w_{3,2}^k$ may be estimated through the DMRS port 3, and a combined channel $e^{j\Phi_3^1} \cdot H_{2,2}^k \cdot e^{j\Theta_3^1} \cdot w_{4,2}^k$ may be estimated through the DMRS port 4. On the symbol where the DMRS is located, based on the hypothesis in FIG. 4, the channels for all subcarriers may be estimated through channel interpolation. Here, k=1, 2, ..., 12.

The receiver may receive the two-port PTRS from the fourth OFDM symbol, estimate $e^{j\Phi_l^1} \cdot H_{2,1}^5 \cdot e^{j\Theta_l^0} \cdot w_{1,1}^5 + e^{j\Phi_l^0} \cdot H_{2,1}^5 \cdot e^{j\Theta_l^0} \cdot w_{2,1}^5$ through the PTRS port 1, and estimate $e^{j\Phi_l^1} \cdot H_{2,2}^4 \cdot e^{j\Theta_l^1} \cdot w_{3,2}^4 + e^{j\Phi_l^0} \cdot H_{2,2}^4 \cdot e^{j\Theta_l^1} \cdot w_{4,2}^4$ through the PTRS port 2, where l≥4.

The receiver may receive information about the mapping of PTRS1 to DMRS1-2 notified by the transmitter through signaling, and divide a channel estimation result for PTRS1 by a sum of channel estimation results for DMRS1 and DMRS2 in accordance with the information, so as to acquire a phase change $$e^{j\phi_l^0} = \frac{e^{j\phi_l^1} \cdot H_{2,1}^5 \cdot e^{j\theta_l^0} \cdot w_{1,1}^5 + e^{j\phi_l^1} \cdot H_{2,1}^5 \cdot e^{j\theta_l^0} \cdot w_{2,1}^5}{e^{j\phi_3^1} \cdot H_{2,1}^5 \cdot e^{j\theta_3^0} \cdot w_{1,1}^5 + e^{j\phi_3^1} \cdot H_{2,1}^5 \cdot e^{j\theta_3^0} \cdot w_{2,1}^5}$$

in a first symbol transmitted via the second reception antenna unit or antenna port relative to a third symbol transmitted via a first group of antenna units or antenna ports for the transmitter.

In addition, based on information about the mapping of PTRS2 to DMRS3 and DMRS4 notified by the transmitter through signaling, the receiver may acquire a phase change $$e^{j\phi_l^1} = \frac{e^{j\phi_l^1} \cdot H_{2,2}^4 \cdot e^{j\theta_l^1} \cdot w_{3,2}^4 + e^{j\phi_l^1} \cdot H_{2,2}^4 \cdot e^{j\theta_l^1} \cdot w_{4,2}^4}{e^{j\phi_3^1} \cdot H_{2,2}^4 \cdot e^{j\theta_3^1} \cdot w_{3,2}^4 + e^{j\phi_3^1} \cdot H_{2,2}^4 \cdot e^{j\theta_3^1} \cdot w_{4,2}^4}$$

in the first symbol transmitted via the second reception antenna unit or antenna port relative to the third symbol transmitted via a second group of antenna units or antenna ports for the transmitter.

Then, the phase changes may be multiplied by the estimated channel for the third symbol, so as to acquire channel estimation values $e^{j\Phi_3^1} \cdot H_{2,1}^k \cdot e^{j\Theta_3^0} \cdot w_{1,1}^k \cdot e^{j\Phi_l^0}$, $e^{j\Phi_3^1} \cdot H_{2,1}^k \cdot e^{j\Theta_3^0} \cdot w_{2,1}^k \cdot e^{j\Phi_l^0}$, $e^{j\Phi_3^1} \cdot H_{2,2}^k \cdot e^{j\Theta_3^1} \cdot w_{3,2}^k \cdot e^{j\Phi_l^1}$, and $e^{j\Phi_3^1} \cdot H_{2,2}^k \cdot e^{j\Theta_3^1} \cdot w_{4,2}^k \cdot e^{j\Phi_l^1}$ on the $k^{th}$ subcarrier of the $l^{th}$ symbol transmitted via the second reception antenna unit or antenna port.

Similarly, it is able to acquire channel estimation values on the $k^{th}$ subcarrier of the $l^{th}$ symbol transmitted via the first, third and fourth reception antenna units or antenna ports.

The second preceding matrix in the second precoding matrix set corresponding to index value of mod (k,S) to be adopted on the $k^{th}$ subcarrier may be determined in accordance with the rule adopted by the second precoding matrix pre-agreed between the transmitter and the receiver. Similar as that in Example 1, the channel matrices estimated for all the antenna groups may be multiplied by the determined second precoding matrix, so as to acquire the complete channel information experienced by the user data on the $k^{th}$ subcarrier.

Then, the receiver may demodulate the user data for each data stream in accordance with the complete channel information. The user data for the data stream transmitted on the other subcarriers may be acquired in a similar manner, which will not be particularly defined herein.

According to the embodiments of the present disclosure, the transmitter may precode the data stream for the user data through the second precoding matrix so as to acquire the D virtual data streams; precode the D virtual data streams through the first precoding matrix, and transmit the D precoded virtual data streams to the receiver via the T antenna groups, each antenna group including one or more antenna units or antenna ports having a same phase noise; transmit the D demodulation reference signals to the receiver, each demodulation reference signal corresponding to one virtual data stream, the precoding vector for each demodulation reference signal being the same as the precoding vector in the first precoding matrix adopted by the corresponding virtual data stream on the subcarrier where the demodulation reference signal is located, each demodulation reference signal and the corresponding virtual data stream being transmitted via the same antenna group; and transmit the M phase-tracking reference signals to the receiver, the M phase-tracking reference signals being adopted to track the phase changes in the T antenna groups caused by one or more phase noise sources. Due to the phase-tracking reference signal from the transmitter, it is able for the receiver to perform the phase compensation in accordance with the received phase-tracking reference signal, thereby to reduce the influence caused by the phase noise.

Figure 7:
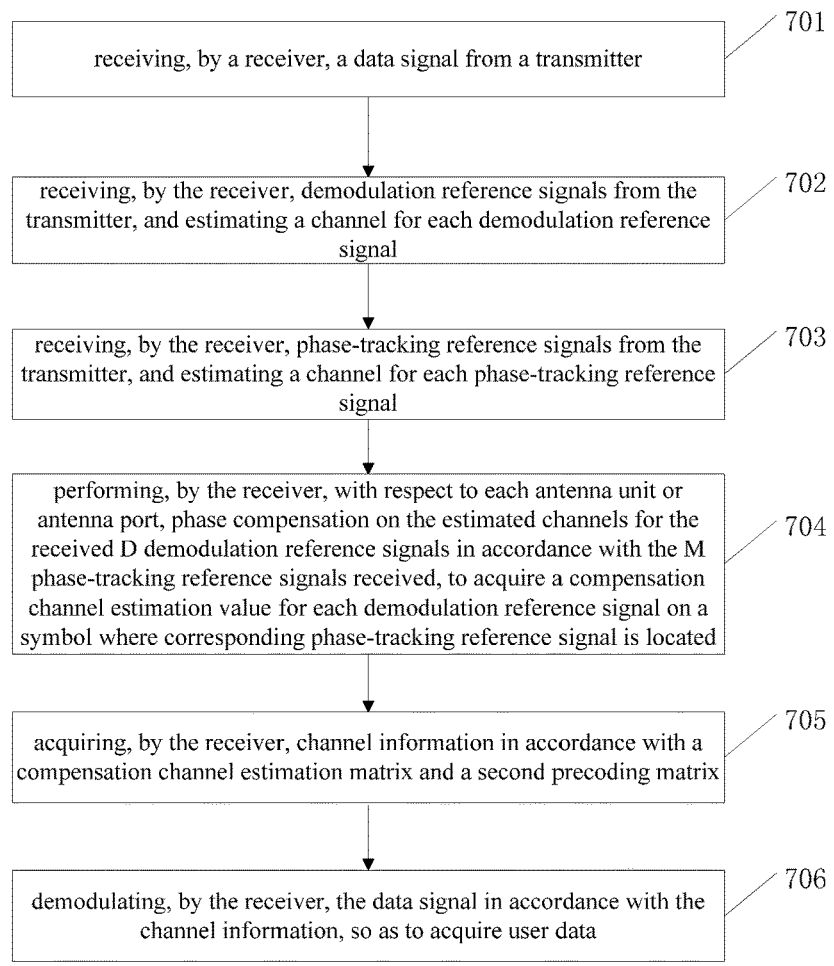
FIG. 7 is a schematic view showing a transmitter according to one embodiment of the present disclosure.

The present disclosure further provides in some embodiments a reference signal transmission method which, as shown in FIG. 7, includes: Step 701 of receiving, by a receiver, a data signal from a transmitter; Step 702 of receiving, by the receiver, demodulation reference signals from the transmitter, and estimating a channel for each demodulation reference signal, each antenna unit or antenna port of the receiver being configured to receive D demodulation reference signals, D being an integer greater than or equal to 1; Step 703 of receiving, by the receiver, phase-tracking reference signals from the transmitter, and estimating a channel for each phase-tracking reference signal, each antenna unit or antenna port of the receiver being configured to receive M phase-tracking reference signals, M being an integer greater than or equal to 1; Step 704 of performing, by the receiver, with respect to each antenna unit or antenna port, phase compensation on the estimated channels for the received D demodulation reference signals in accordance with the M phase-tracking reference signals received via the antenna unit or antenna port, so as to acquire a compensation channel estimation value for each demodulation reference signal on a symbol where the corresponding phase-tracking reference signal is located; Step 705 of acquiring, by the receiver, channel information in accordance with a compensation channel estimation matrix and a second precoding matrix, the compensation channel estimation matrix including the compensation channel estimation value for each demodulation reference signal received via the antenna unit or antenna port on the symbol where the corresponding phase-tracking reference signal is located; and Step 706 of demodulating, by the receiver, the data signal in accordance with the channel information, so as to acquire user data.

It should be appreciated that, Step 704 may be performed with respect to each antenna unit or antenna port. The description about each antenna unit or antenna port may refer to that in FIG. 2 with a same beneficial effect, and thus will not be particularly defined herein. In addition, an order of Steps 701 to 703 will not be particularly defined.

In some possible embodiments of the present disclosure, the performing, by the receiver, with respect to each antenna unit or antenna port, phase compensation on the estimated channels for the received D demodulation reference signals in accordance with the M phase-tracking reference signals received via the antenna unit or antenna port so as to acquire the compensation channel estimation value for each demodulation reference signal on the symbol where the corresponding phase-tracking reference signal is located may include: determining, by the receiver, with respect to each antenna unit or antenna port, the demodulation reference signal corresponding to each phase-tracking reference signal received via the antenna unit or antenna port in accordance with a mapping relationship between the demodulation reference signals and the phase-tracking reference signals; comparing, by the receiver, the estimated channel for each phase-tracking reference signal with the estimated channel for the corresponding demodulation reference signal, so as to acquire phase change information corresponding to the phase-tracking reference signal; and performing, by the receiver, phase noise compensation on the estimated channel for the corresponding demodulation reference signal in accordance with the phase change information corresponding to each phase-tracking reference signal, so as to acquire the compensation channel estimation value for each demodulation reference signal on the symbol where the corresponding phase-tracking reference signal is located.

In some possible embodiments of the present disclosure, the mapping relationship may be pre-agreed between the transmitter and the receiver, or the reference signal transmission method may further include receiving, by the receiver, the mapping relationship from the transmitter.

In some possible embodiments of the present disclosure, the acquiring, by the receiver, the channel information in accordance with the compensation channel estimation matrix and the second precoding matrix may include multiplying, by the receiver, the compensation channel estimation matrix by the second precoding matrix so as to acquire the channel information.

In some possible embodiments of the present disclosure, information about the second precoding matrix may be pre-agreed between the transmitter and the receiver. Alternatively, the reference signal transmission method may further include: receiving, by the receiver, the information about the second precoding matrix from the transmitter; or receiving, by the receiver, a rule adopted by the second precoding matrix on a data bandwidth from the transmitter, and acquiring the second precoding matrix in accordance with the rule.

It should be appreciated that, the implementation of the reference signal transmission method may refer to the relevant description about the receiver in FIG. 2 with a same effect of reducing the phase noise, and thus will not be particularly defined herein.

Figure 8:
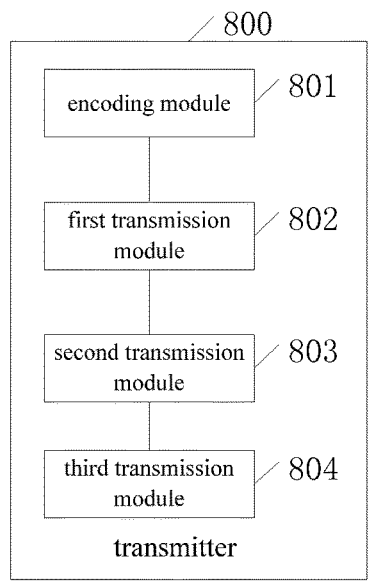
FIG. 8 is another schematic view showing the transmitter according to one embodiment of the present disclosure.

The present disclosure further provides in some embodiments a transmitter 800 which, as shown in FIG. 8, includes: an encoding module 801 configured to precode a data stream for user data through a second precoding matrix so as to acquire D virtual data streams; a first transmission module 802 configured to precode the D virtual data streams through a first precoding matrix, and transmit the D precoded virtual data streams to a receiver via T antenna groups, each antenna group including one or more antenna units or antenna ports having a same phase noise, T being an integer greater than or equal to 1, D being an integer greater than or equal to 1; a second transmission module 803 configured to transmit D demodulation reference signals to the receiver, each demodulation reference signal corresponding to one virtual data stream, a precoding vector for each demodulation reference signal being the same as a precoding vector in the first precoding matrix adopted by the corresponding virtual data stream on a subcarrier where the demodulation reference signal is located, each demodulation reference signal and the corresponding virtual data stream being transmitted via a same antenna group; and a third transmission module 804 configured to transmit M phase-tracking reference signals to the receiver, the M phase-tracking reference signals being adopted to track phase changes in the T antenna groups caused by one or more phase noise sources, M being an integer greater than or equal to 1.

In some possible embodiments of the present disclosure, each virtual data stream may be precoded and then transmitted via one or more antenna groups, and the one or more antenna groups for the same virtual data stream may have a same phase noise.

In some possible embodiments of the present disclosure, among the precoding vectors in the first precoding matrix adopted by each virtual data stream, apart from weight values corresponding to the one or more antenna groups for the virtual data stream, weight values corresponding to the antenna units or antenna ports in the other antenna groups may be zero.

In some possible embodiments of the present disclosure, each phase-tracking reference signal may be precoded and then transmitted via one or more antenna groups, and the one or more antenna groups for the same phase-tracking reference signal may have a same phase noise.

In some possible embodiments of the present disclosure, among precoding vectors adopted by each phase-tracking reference signal, apart from weight values corresponding to one or more antenna groups adopted by the phase-tracking reference signal, weight values corresponding to the antenna units or antenna ports in the other antenna groups may be zero.

Figure 9:
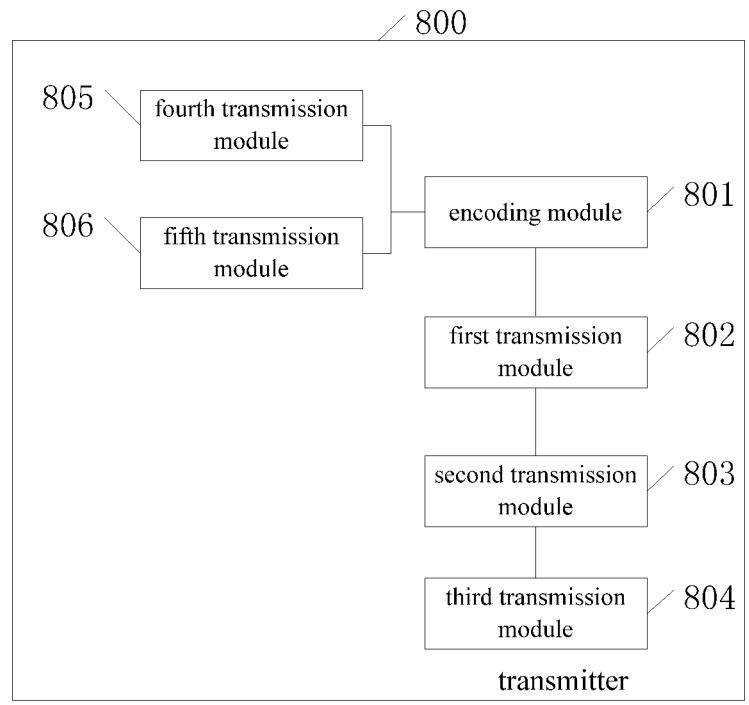
FIG. 9 is yet another schematic view showing the transmitter according to one embodiment of the present disclosure.

In some possible embodiments of the present disclosure, information about the second precoding matrix may be pre-agreed between the transmitter and the receiver. Alternatively, as shown in FIG. 9, the transmitter 800 may further include: a fourth transmission module 805 configured to transmit the information about the second precoding matrix to the receiver; or a fifth transmission module 806 configured to transmit a rule adopted by the second precoding matrix on a data bandwidth to the receiver.

Figure 10:
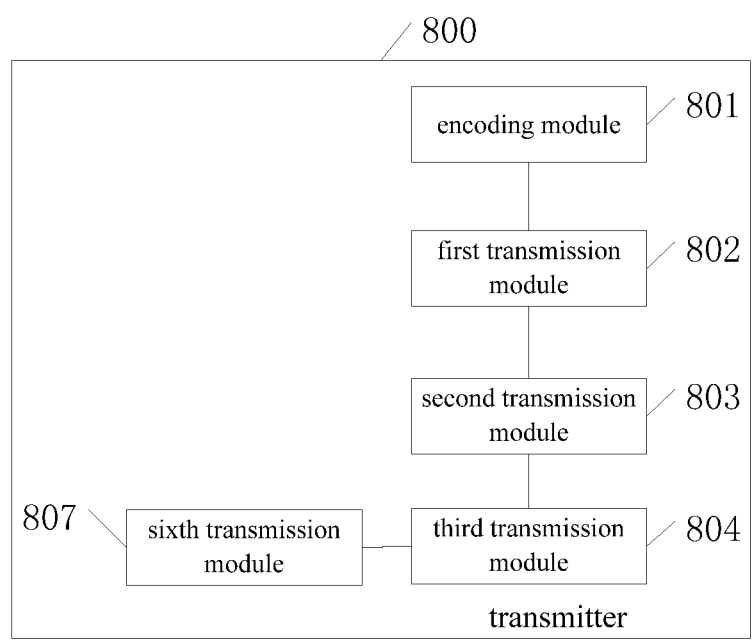
FIG. 10 is still yet another schematic view showing the transmitter according to one embodiment of the present disclosure.

In some possible embodiments of the present disclosure, as shown in FIG. 10, the transmitter 800 may further include a sixth transmission module 807 configured to transmit the mapping relationship between the demodulation reference signals and the phase-tracking reference signals to the receiver, or a mapping relationship between the demodulation reference signals and the phase-tracking reference signals may pre-agreed between the transmitter and the receiver.

In some possible embodiments of the present disclosure, in the mapping relationship between the demodulation reference signals and the phase-tracking reference signals, one phase-tracking reference signal may at least correspond to one demodulation reference signal, and each phase-tracking reference signal and the corresponding demodulation reference signal are transmitted via a same antenna group; and a precoding vector adopted by each phase-tracking reference signal may be associated with a precoding vector in the first precoding matrix adopted by the corresponding virtual data stream on a subcarrier where the phase-tracking reference signal is located, and the virtual data stream corresponding to each phase-tracking reference signal may correspond to the demodulation reference signal corresponding to the phase-tracking reference signal.

In some possible embodiments of the present disclosure, when each phase-tracking reference signal corresponds to one demodulation reference signal, the precoding vector adopted by the phase-tracking reference signal may be the same as the precoding vector in the first precoding matrix adopted by the corresponding virtual data stream on the subcarrier where the phase-tracking reference signal is located; and when each phase-tracking reference signal corresponds to a plurality of demodulation reference signals, the precoding vector adopted by the phase-tracking reference signal may be calculated in accordance with the precoding vectors in the first precoding matrix adopted by a plurality of virtual data streams on the subcarrier where the phase-tracking reference signal is located, and the plurality of virtual data streams may correspond to the plurality of demodulation reference signals.

It should be appreciated that, the implementation of the transmitter 800 may refer to that of the reference signal transmission method for use in the transmitter as mentioned hereinabove with a same beneficial effect, and thus will not be particularly defined herein.

Figure 11:
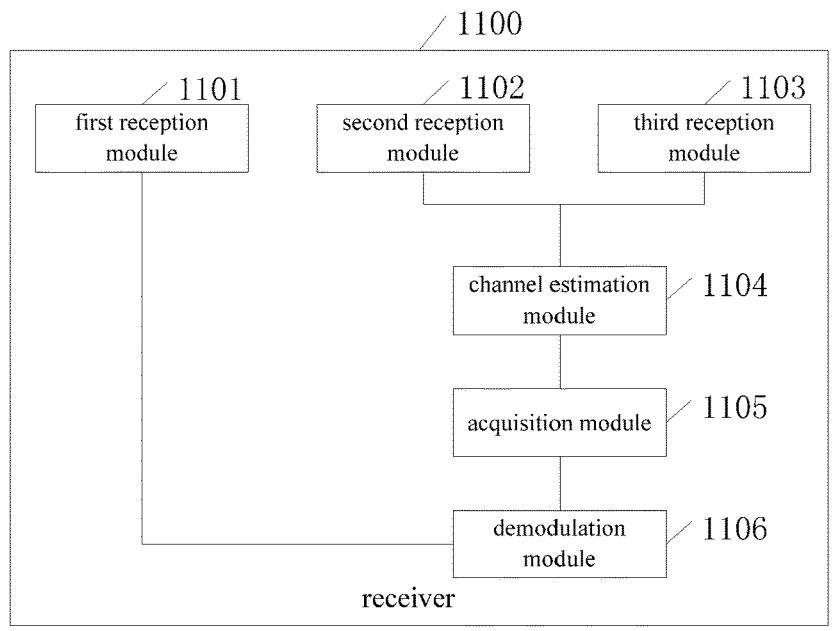
FIG. 11 is a schematic view showing a receiver according to one embodiment of the present disclosure.

The present disclosure further provides in some embodiments a receiver 1100 which, as shown in FIG. 11, includes: a first reception module 1101 configured to receive a data signal from a transmitter; a second reception module 1102 configured to receive demodulation reference signals from the transmitter, and estimate a channel for each demodulation reference signal, each antenna unit or antenna port of the receiver being configured to receive D demodulation reference signals, D being an integer greater than or equal to 1; a third reception module 1103 configured to receive phase-tracking reference signals from the transmitter, and estimate a channel for each phase-tracking reference signal, each antenna unit or antenna port of the receiver being configured to receive M phase-tracking reference signals, M being an integer greater than or equal to 1; a channel estimation module 1104 configured to, with respect to each antenna unit or antenna port, perform phase compensation on the estimated channels for the received D demodulation reference signals in accordance with the M phase-tracking reference signals received via the antenna unit or antenna port, so as to acquire a compensation channel estimation value for each demodulation reference signal on a symbol where the corresponding phase-tracking reference signal is located; an acquisition module 1105 configured to acquire channel information in accordance with a compensation channel estimation matrix and a second precoding matrix, the compensation channel estimation matrix including the compensation channel estimation value for each demodulation reference signal received via the antenna unit or antenna port on the symbol where the corresponding phase-tracking reference signal is located; and a demodulation module 1106 configured to demodulate the data signal in accordance with the channel information, so as to acquire user data.

Figure 12:
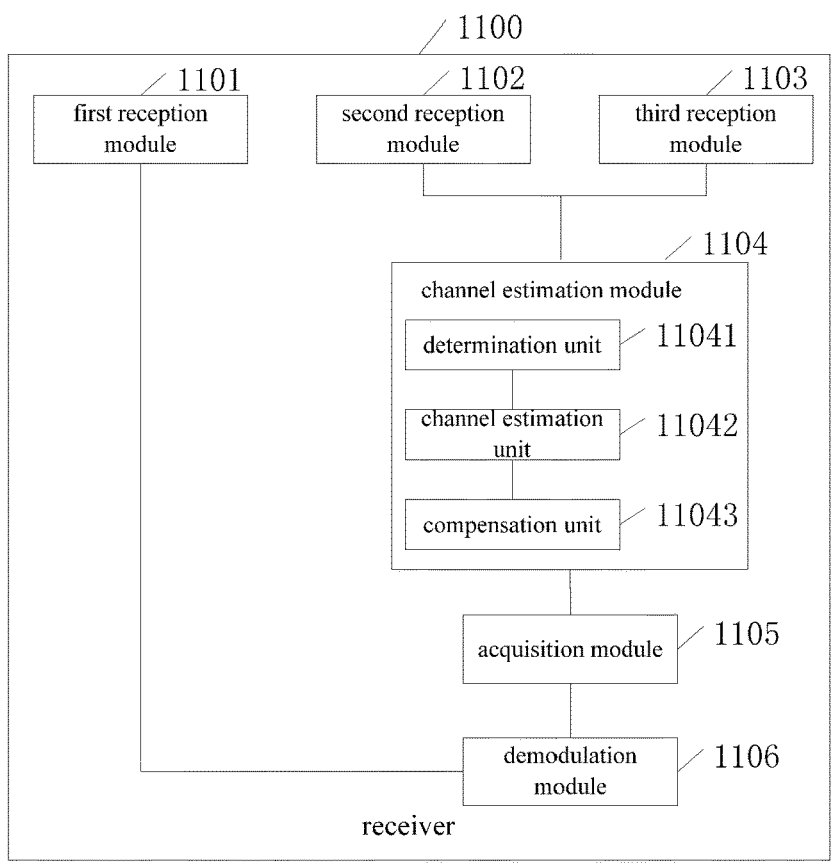
FIG. 12 is another schematic view showing the receiver according to one embodiment of the present disclosure.

In some possible embodiments of the present disclosure, as shown in FIG. 12, the channel estimation module 1104 may include: a determination unit 11041 configured to, with respect to each antenna unit or antenna port, determine the demodulation reference signal corresponding to each phase-tracking reference signal received via the antenna unit or antenna port in accordance with a mapping relationship between the demodulation reference signals and the phase-tracking reference signals; a channel estimation unit 11042 configured to compare the estimated channel for each phase-tracking reference signal with the estimated channel for the corresponding demodulation reference signal, so as to acquire phase change information corresponding to the phase-tracking reference signal; and a compensation unit 11043 configured to perform phase noise compensation on the estimated channel for the corresponding demodulation reference signal in accordance with the phase change information corresponding to each phase-tracking reference signal, so as to acquire the compensation channel estimation value for each demodulation reference signal on the symbol where the corresponding phase-tracking reference signal is located.

Figure 13:
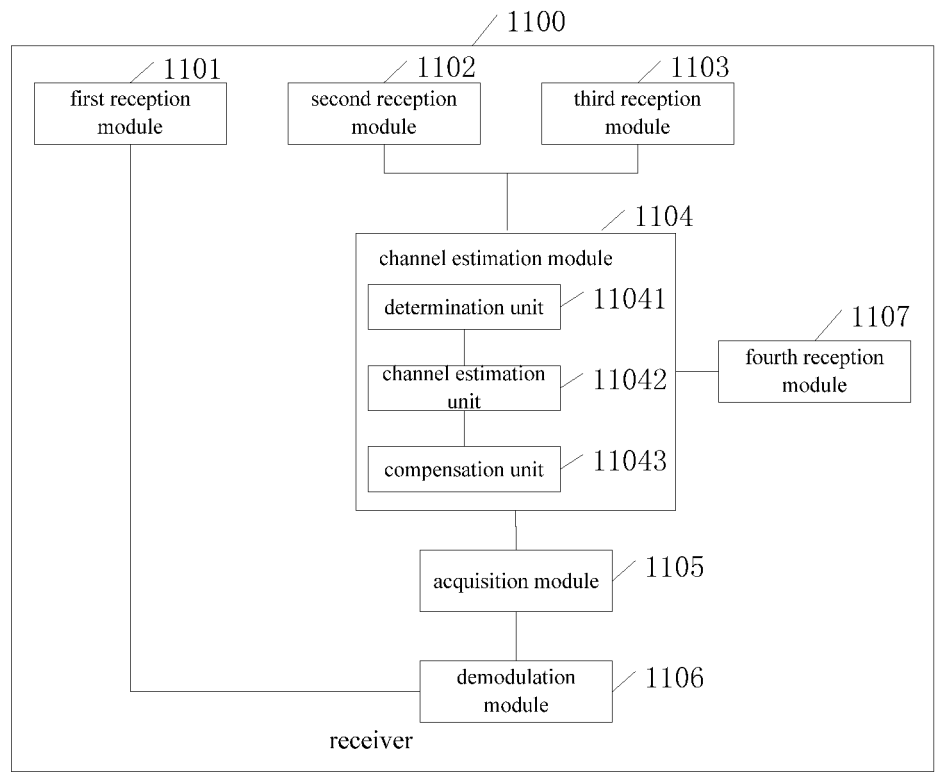
FIG. 13 is yet another schematic view showing the receiver according to one embodiment of the present disclosure.

In some possible embodiments of the present disclosure, the mapping relationship may be pre-agreed between the transmitter and the receiver, or the receiver 1100 may further include a fourth reception module 1107 configured to receive the mapping relationship from the transmitter, as shown in FIG. 13.

In some possible embodiments of the present disclosure, the acquisition module 1105 is further configured to multiply the compensation channel estimation matrix by the second precoding matrix so as to acquire the channel information.

Figure 14:
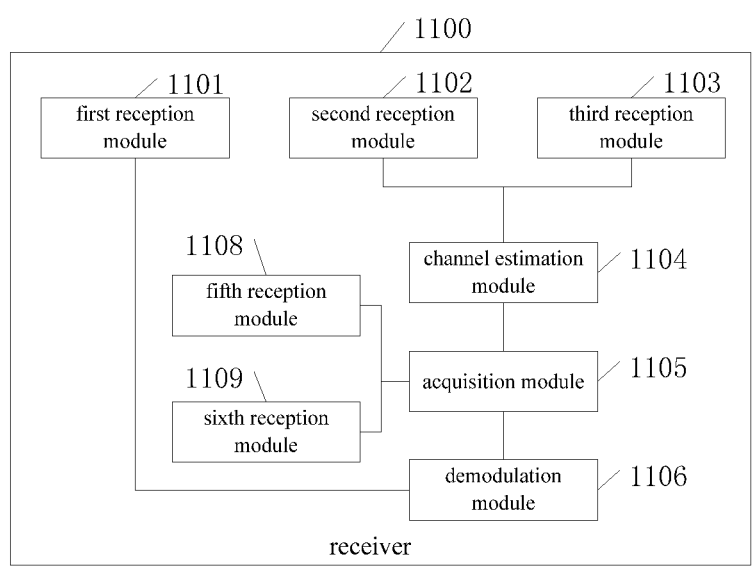
FIG. 14 is still yet another schematic view showing the receiver according to one embodiment of the present disclosure.

In some possible embodiments of the present disclosure, information about the second precoding matrix is pre-agreed between the transmitter and the receiver. Alternatively, as shown in FIG. 14, the receiver 1100 may further include: a fifth reception module 1108 configured to receive the information about the second precoding matrix from the transmitter; or a sixth reception module 1109 configured to receive a rule adopted by the second precoding matrix on a data bandwidth from the transmitter, and acquire the second precoding matrix in accordance with the rule.

It should be appreciated that, the implementation of the receiver 1100 may refer to that of the reference signal transmission method for use in the receiver as mentioned hereinabove with a same beneficial effect, and thus will not be particularly defined herein.

Figure 15:
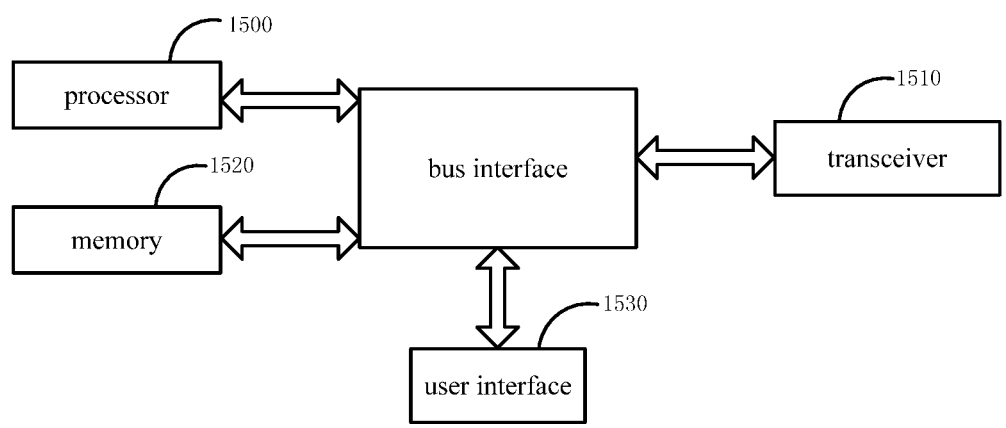
FIG. 15 is still yet another schematic view showing the transmitter according to one embodiment of the present disclosure.

The present disclosure further provides in some embodiments a transmitter which, as shown in FIG. 15, includes a processor 1500, a transceiver 1510, a memory 1520, a user interface 1530 and a bus interface. The processor 1500 is configured to read a program stored in the memory 1520, so as to: precode a data stream for user data through a second precoding matrix so as to acquire D virtual data streams; precode the D virtual data streams through a first precoding matrix, and transmit the D precoded virtual data streams to a receiver via T antenna groups, each antenna group including one or more antenna units or antenna ports having a same phase noise, T being an integer greater than or equal to 1, D being an integer greater than or equal to 1; transmit D demodulation reference signals to the receiver, each demodulation reference signal corresponding to one virtual data stream, a precoding vector for each demodulation reference signal being the same as a precoding vector in the first precoding matrix adopted by the corresponding virtual data stream on a subcarrier where the demodulation reference signal is located, each demodulation reference signal and the corresponding virtual data stream being transmitted via a same antenna group; and transmit M phase-tracking reference signals to the receiver, the M phase-tracking reference signals being adopted to track phase changes in the T antenna groups caused by one or more phase noise sources, M being an integer greater than or equal to 1.

The transceiver 1510 is configured to receive and transmit data under the control of the processor 1500, and it may include the above T antenna groups.

In FIG. 15, bus architecture may include a number of buses and bridges connected to each other, so as to connect various circuits for one or more processors 1500 and one or more memories 1520. In addition, as is known in the art, the bus architecture may be used to connect any other circuits, such as a circuit for a peripheral device, a circuit for a voltage stabilizer and a power management circuit. The bus interface may be provided, and the transceiver 1510 may consist of a plurality of elements, i.e., a transmitter and a receiver for communication with any other devices over a transmission medium. With respect to different UEs, the user interface 1530 may also be provided for devices which are to be arranged inside or outside the UE, and these devices may include but not limited to a keypad, a display, a speaker, a microphone and a joystick. The processor 1500 may take charge of managing the bus architecture as well as general processings. The memory 1520 may store therein data for the operation of the processor 1500.

In some possible embodiments of the present disclosure, each virtual data stream may be precoded and then transmitted via one or more antenna groups, and the one or more antenna groups for the same virtual data stream may have a same phase noise.

In some possible embodiments of the present disclosure, among the precoding vectors in the first precoding matrix adopted by each virtual data stream, apart from weight values corresponding to the one or more antenna groups for the virtual data stream, weight values corresponding to the antenna units or antenna ports in the other antenna groups may be zero.

In some possible embodiments of the present disclosure, each phase-tracking reference signal may be precoded and then transmitted via one or more antenna groups, and the one or more antenna groups for the same phase-tracking reference signal may have a same phase noise.

In some possible embodiments of the present disclosure, among precoding vectors adopted by each phase-tracking reference signal, apart from weight values corresponding to one or more antenna groups adopted by the phase-tracking reference signal, weight values corresponding to the antenna units or antenna ports in the other antenna groups may be zero.

In some possible embodiments of the present disclosure, information about the second precoding matrix may be pre-agreed between the transmitter and the receiver. Alternatively, the processor 1500 is further configured to: transmit through the transceiver 1510 the information about the second precoding matrix to the receiver; or transmit through the transceiver 1510 a rule adopted by the second precoding matrix on a data bandwidth to the receiver.

In some possible embodiments of the present disclosure, a mapping relationship between the demodulation reference signals and the phase-tracking reference signals may pre-agreed between the transmitter and the receiver, or the processor 1500 is further configured to transmit through the transceiver 1510 the mapping relationship between the demodulation reference signals and the phase-tracking reference signals to the receiver.

In some possible embodiments of the present disclosure, in the mapping relationship between the demodulation reference signals and the phase-tracking reference signals, one phase-tracking reference signal may at least correspond to one demodulation reference signal, and each phase-tracking reference signal and the corresponding demodulation reference signal are transmitted via a same antenna group; and a precoding vector adopted by each phase-tracking reference signal may be associated with a precoding vector in the first precoding matrix adopted by the corresponding virtual data stream on a subcarrier where the phase-tracking reference signal is located, and the virtual data stream corresponding to each phase-tracking reference signal may correspond to the demodulation reference signal corresponding to the phase-tracking reference signal.

In some possible embodiments of the present disclosure, when each phase-tracking reference signal corresponds to one demodulation reference signal, the precoding vector adopted by the phase-tracking reference signal may be the same as the precoding vector in the first precoding matrix adopted by the corresponding virtual data stream on the subcarrier where the phase-tracking reference signal is located; and when each phase-tracking reference signal corresponds to a plurality of demodulation reference signals, the precoding vector adopted by the phase-tracking reference signal may be calculated in accordance with the precoding vectors in the first precoding matrix adopted by a plurality of virtual data streams on the subcarrier where the phase-tracking reference signal is located, and the plurality of virtual data streams may correspond to the plurality of demodulation reference signals.

It should be appreciated that, the implementation of the transmitter may refer to that of the reference signal transmission method for use in the transmitter as mentioned hereinabove with a same beneficial effect, and thus will not be particularly defined herein.

Figure 16:
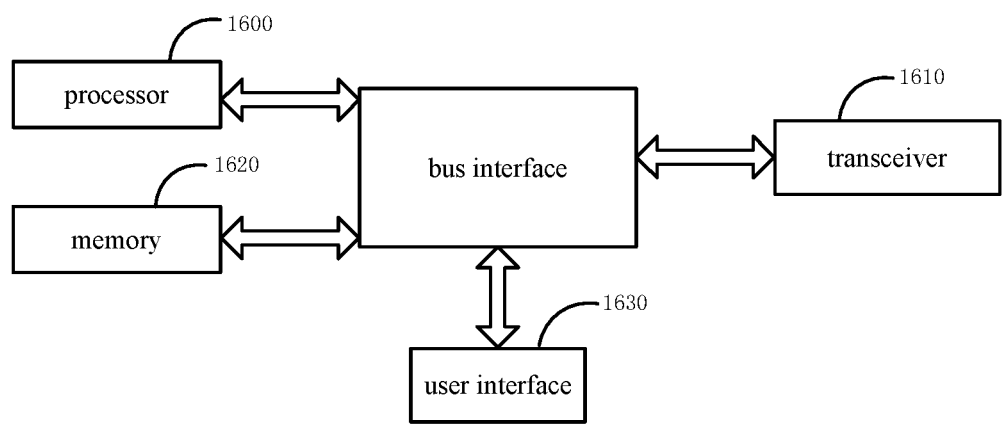
FIG. 16 is still yet another schematic view showing the receiver according to one embodiment of the present disclosure.

The present disclosure further provides in some embodiments a receiver which, as shown in FIG. 16, includes a processor 1600, a transceiver 1610, a memory 1620, a user interface 1630 and a bus interface. The processor 1600 is configured to read a program stored in the memory 1620, so as to: receive through the transceiver 1610 a data signal from a transmitter; receive demodulation reference signals from the transmitter, and estimate a channel for each demodulation reference signal, each antenna unit or antenna port of the receiver being configured to receive D demodulation reference signals, D being an integer greater than or equal to 1; receive phase-tracking reference signals from the transmitter, and estimate a channel for each phase-tracking reference signal, each antenna unit or antenna port of the receiver being configured to receive M phase-tracking reference signals, M being an integer greater than or equal to 1; with respect to each antenna unit or antenna port, perform phase compensation on the estimated channels for the received D demodulation reference signals in accordance with the M phase-tracking reference signals received via the antenna unit or antenna port, so as to acquire a compensation channel estimation value for each demodulation reference signal on a symbol where the corresponding phase-tracking reference signal is located; acquire channel information in accordance with a compensation channel estimation matrix and a second precoding matrix, the compensation channel estimation matrix including the compensation channel estimation value for each demodulation reference signal received via the antenna unit or antenna port on the symbol where the corresponding phase-tracking reference signal is located; and demodulate the data signal in accordance with the channel information, so as to acquire user data.

The transceiver 1610 is configured to receive and transmit data under the control of the processor 1600, and it may include the above-mentioned antenna units or antenna ports.

In FIG. 16, bus architecture may include a number of buses and bridges connected to each other, so as to connect various circuits for one or more processors 1600 and one or more memories 1620. In addition, as is known in the art, the bus architecture may be used to connect any other circuits, such as a circuit for a peripheral device, a circuit for a voltage stabilizer and a power management circuit. The bus interface may be provided, and the transceiver 1610 may consist of a plurality of elements, i.e., a transmitter and a receiver for communication with any other devices over a transmission medium. With respect to different UEs, the user interface 1630 may also be provided for devices which are to be arranged inside or outside the UE, and these devices may include but not limited to a keypad, a display, a speaker, a microphone and a joystick. The processor 1600 may take charge of managing the bus architecture as well as general processings. The memory 1620 may store therein data for the operation of the processor 1600.

In some possible embodiments of the present disclosure, the processor 1600 is further configured to: with respect to each antenna unit or antenna port, determine the demodulation reference signal corresponding to each phase-tracking reference signal received via the antenna unit or antenna port in accordance with a mapping relationship between the demodulation reference signals and the phase-tracking reference signals; compare the estimated channel for each phase-tracking reference signal with the estimated channel for the corresponding demodulation reference signal, so as to acquire phase change information corresponding to the phase-tracking reference signal; and perform phase noise compensation on the estimated channel for the corresponding demodulation reference signal in accordance with the phase change information corresponding to each phase-tracking reference signal, so as to acquire the compensation channel estimation value for each demodulation reference signal on the symbol where the corresponding phase-tracking reference signal is located.

In some possible embodiments of the present disclosure, the mapping relationship may be pre-agreed between the transmitter and the receiver, or the processor 1600 is further configured to receive through the transceiver 1610 the mapping relationship from the transmitter.

In some possible embodiments of the present disclosure, the processor 1600 is further configured to multiply the compensation channel estimation matrix by the second precoding matrix so as to acquire the channel information.

In some possible embodiments of the present disclosure, information about the second precoding matrix is pre-agreed between the transmitter and the receiver. Alternatively, the processor 1600 is further configured to: receive through the transceiver 1610 the information about the second precoding matrix from the transmitter; or receive through the transceiver 1610 a rule adopted by the second precoding matrix on a data bandwidth from the transmitter, and acquire the second precoding matrix in accordance with the rule.

It should be appreciated that, the implementation of the receiver may refer to that of the reference signal transmission method for use in the receiver as mentioned hereinabove with a same beneficial effect, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A reference signal transmission method, comprising:
    precoding, by a transmitter, a data stream for user data through a second precoding matrix so as to acquire D virtual data streams;
    precoding, by the transmitter, the D virtual data streams through a first precoding matrix, and transmitting the D precoded virtual data streams to a receiver via T antenna groups, each antenna group comprising one or more antenna units or antenna ports having a same phase noise, T being an integer greater than or equal to 1, D being an integer greater than or equal to 1;
    transmitting, by the transmitter, D demodulation reference signals to the receiver, each demodulation reference signal corresponding to one virtual data stream, a precoding vector for each demodulation reference signal being the same as a precoding vector in the first precoding matrix adopted by the corresponding virtual data stream on a subcarrier where the demodulation reference signal is located, each demodulation reference signal and the corresponding virtual data stream being transmitted via a same antenna group; and
    transmitting, by the transmitter, M phase-tracking reference signals to the receiver, the M phase-tracking reference signals being adopted to track phase changes in the T antenna groups caused by one or more phase noise sources, M being an integer greater than or equal to 1; wherein
    one phase-tracking reference signal at least corresponds to one demodulation reference signal, and each phase-tracking reference signal and the corresponding demodulation reference signal are transmitted via a same antenna group.

2. The reference signal transmission method according to claim 1, wherein each virtual data stream is precoded and then transmitted via one or more antenna groups, and the one or more antenna groups for the same virtual data stream have a same phase noise.

3. The reference signal transmission method according to claim 2, wherein among the precoding vectors in the first precoding matrix adopted by each virtual data stream, apart from weight values corresponding to the one or more antenna groups for the virtual data stream, weight values corresponding to the antenna units or antenna ports in the other antenna groups are zero.

4. The reference signal transmission method according to claim 1, wherein each phase-tracking reference signal is precoded and then transmitted via one or more antenna groups, and the one or more antenna groups for the same phase-tracking reference signal have a same phase noise.

5. The reference signal transmission method according to claim 4, wherein among precoding vectors adopted by each phase-tracking reference signal, apart from weight values corresponding to one or more antenna groups adopted by the phase-tracking reference signal, weight values corresponding to the antenna units or antenna ports in the other antenna groups are zero.

6. The reference signal transmission method according to claim 1, wherein information about the second precoding matrix is pre-agreed between the transmitter and the receiver, or
    the reference signal transmission method further comprises:
    transmitting, by the transmitter, the information about the second precoding matrix to the receiver; or
    transmitting, by the transmitter, a rule adopted by the second precoding matrix on a data bandwidth to the receiver.

7. The reference signal transmission method according to claim 1, wherein a mapping relationship between the demodulation reference signals and the phase-tracking reference signals is pre-agreed between the transmitter and the receiver, or
    the reference signal transmission method further comprises transmitting, by the transmitter, the mapping relationship between the demodulation reference signals and the phase-tracking reference signals to the receiver.

8. The reference signal transmission method according to claim 7, wherein in the mapping relationship between the demodulation reference signals and the phase-tracking reference signals, and
    a precoding vector adopted by each phase-tracking reference signal is associated with a precoding vector in the first precoding matrix adopted by the corresponding virtual data stream on a subcarrier where the phase-tracking reference signal is located, and the virtual data stream corresponding to each phase-tracking reference signal corresponds to the demodulation reference signal corresponding to the phase-tracking reference signal.

9. The reference signal transmission method according to claim 8, wherein when each phase-tracking reference signal corresponds to one demodulation reference signal, the precoding vector adopted by the phase-tracking reference signal is the same as the precoding vector in the first precoding matrix adopted by the corresponding virtual data stream on the subcarrier where the phase-tracking reference signal is located; and
    when each phase-tracking reference signal corresponds to a plurality of demodulation reference signals, the precoding vector adopted by the phase-tracking reference signal is calculated in accordance with the precoding vectors in the first precoding matrix adopted by a plurality of virtual data streams on the subcarrier where the phase-tracking reference signal is located, and the plurality of virtual data streams corresponds to the plurality of demodulation reference signals.

10. A transmitter, comprising a processor, a memory connected to the processor via a bus interface, and a transceiver connected to the processor via the bus interface,
    wherein the processor is configured to read a program stored in the memory, so as to:
    precode a data stream for user data through a second precoding matrix so as to acquire D virtual data streams;
    precode the D virtual data streams through a first precoding matrix, and transmit the D precoded virtual data streams to a receiver via T antenna groups, each antenna group comprising one or more antenna units or antenna ports having a same phase noise, T being an integer greater than or equal to 1, D being an integer greater than or equal to 1;

transmit D demodulation reference signals to the receiver, each demodulation reference signal corresponding to one virtual data stream, a precoding vector for each demodulation reference signal being the same as a precoding vector in the first precoding matrix adopted by the corresponding virtual data stream on a subcarrier where the demodulation reference signal is located, each demodulation reference signal and the corresponding virtual data stream being transmitted via a same antenna group; and transmit M phase-tracking reference signals to the receiver, the M phase-tracking reference signals being adopted to track phase changes in the T antenna groups caused by one or more phase noise sources, M being an integer greater than or equal to 1, wherein the transceiver is configured to receive and transmit data, wherein the memory is configured to store therein data for the operation of the processor, and wherein one phase-tracking reference signal at least corresponds to one demodulation reference signal, and each phase-tracking reference signal and the corresponding demodulation reference signal are transmitted via a same antenna group.

11. The transmitter according to claim 10, wherein each virtual data stream is precoded and then transmitted via one or more antenna groups, and the one or more antenna groups for the same virtual data stream have a same phase noise.

12. The transmitter according to claim 11, wherein among the precoding vectors in the first precoding matrix adopted by each virtual data stream, apart from weight values corresponding to the one or more antenna groups for the virtual data stream, weight values corresponding to the antenna units or antenna ports in the other antenna groups are zero.

13. The transmitter according to claim 10, wherein each phase-tracking reference signal is precoded and then transmitted via one or more antenna groups, and the one or more antenna groups for the same phase-tracking reference signal have a same phase noise.

14. The transmitter according to claim 13, wherein among precoding vectors adopted by each phase-tracking reference signal, apart from weight values corresponding to one or more antenna groups adopted by the phase-tracking reference signal, weight values corresponding to the antenna units or antenna ports in the other antenna groups are zero.

* * * * *